(12) United States Patent
Moon et al.

(10) Patent No.: US 11,064,575 B2
(45) Date of Patent: Jul. 13, 2021

(54) INDUCTION HEATING DEVICE HAVING IMPROVED TARGET OBJECT DETECTION ACCURACY AND INDUCTION HEATING SYSTEM INCLUDING THE SAME

(71) Applicant: LG Electronics Inc., Seoul (KR)

(72) Inventors: Hyunwook Moon, Seoul (KR); Eui Sung Kim, Seoul (KR); Dooyong Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 16/165,015

(22) Filed: Oct. 19, 2018

(65) Prior Publication Data

US 2019/0124726 A1 Apr. 25, 2019

(30) Foreign Application Priority Data

Oct. 19, 2017 (KR) .......................... 10-2017-0136079
Dec. 15, 2017 (KR) .......................... 10-2017-0173673

(51) Int. Cl.
*H05B 6/06* (2006.01)
*H05B 6/04* (2006.01)
(Continued)

(52) U.S. Cl.
CPC .......... *H05B 6/065* (2013.01); *H05B 6/1236* (2013.01); *H05B 6/1272* (2013.01); *H05B 2213/05* (2013.01)

(58) Field of Classification Search
CPC .... H05B 6/1236; H05B 6/1272; H05B 6/065; H05B 2213/05; Y02B 40/00
(Continued)

(56) References Cited

U.S. PATENT DOCUMENTS 5,354,971 A * 10/1994 Chen .................. H05B 6/04
219/661
8,558,148 B2 * 10/2013 Artigas Maestre .... H05B 6/065
219/662

(Continued)

FOREIGN PATENT DOCUMENTS

EP 2533605 12/2012
EP 2642819 9/2013
(Continued)

OTHER PUBLICATIONS

Extended European Search Report in European Application No. 18201386.2, dated Mar. 26, 2019, 8 pages.

*Primary Examiner* — Quang T Van
(74) *Attorney, Agent, or Firm* — Fish & Richardson P.C.

(57) ABSTRACT

An induction heating device includes first and second working coils connected to each other electrically in parallel, an inverter unit configured to cause a resonant current to flow in at least one of the first working coil or the second working coil, a first semiconductor switch configured to turn on and off the first working coil; a second semiconductor switch configured to turn on and off the second working coil; and a control unit configured to apply the resonant current to the first working coil or the second working coil by controlling the inverter unit, the first semiconductor switch, and the second semiconductor switch, and, based on a number of pulses or a frequency of the resonant current, to detect whether a target object is located at a location corresponding to the first working coil or the second working coil.

20 Claims, 19 Drawing Sheets

(51) Int. Cl.
*H05B 6/12* (2006.01)
*H05B 6/44* (2006.01)

(58) Field of Classification Search
USPC ....... 219/665, 660, 661, 662, 663, 664, 670, 219/671, 672, 622–626; 363/97, 98, 133, 363/134
See application file for complete search history.

(56) References Cited

U.S. PATENT DOCUMENTS

| | | | |
|---|---|---|---|
| 2011/0226756 A1 | 9/2011 | Arnal Valero et al. | |
| 2012/0152935 A1 | 6/2012 | Kitaizumi et al. | |
| 2012/0248098 A1* | 10/2012 | Lee ...................... | H05B 6/1272 219/660 |
| 2016/0029439 A1* | 1/2016 | Kurose ................ | H05B 6/1209 219/626 |

FOREIGN PATENT DOCUMENTS

| | | |
|---|---|---|
| EP | 2999302 | 3/2016 |
| EP | 3130197 | 11/2017 |

* cited by examiner

… (1) …

INDUCTION HEATING DEVICE HAVING IMPROVED TARGET OBJECT DETECTION ACCURACY AND INDUCTION HEATING SYSTEM INCLUDING THE SAME

CROSS-REFERENCE TO RELATED APPLICATIONS

This application claims priority to and the benefit of Korean Application Nos. 10-2017-0136079 filed on Oct. 19, 2017, and 10-2017-0173673 filed on Dec. 15, 2017, the entire contents of which are incorporated herein by reference.

FIELD

This application relates to an induction heating device having improved target object detection accuracy and an induction heating system including the same.

BACKGROUND

Various types of cooking utensils are used to heat food in homes and restaurants. For example, gas ranges use gas as a fuel. In some cases, a heating device may use electricity for heating an object such as a cooking pot.

A method of heating an object to be heated using electricity can be divided into a resistance heating method and an induction heating method. For example, an electric resistance method may include transferring heat, which is generated when a current is passed through a metal-resistant wire or a non-metallic heating element such as silicon carbide, to an object by radiation or conduction. The induction heating method may include generating an eddy current in an object to be heated (for example, a cooking container) that is made of a metal component by using a magnetic field generated around a coil when a predetermined magnitude of high-frequency power is applied to the coil so that the object to be heated itself is heated.

Recently, technology for supplying power in a wireless manner has been developed and applied to electronic devices. In some cases, the electronic devices with wireless power transferring technology are charged by simply placing them on a charging pad without connecting them to a charging connector. In some cases, the electronic devices with the wireless power transferring technology may not require a cord or a charger, thereby improving portability of the electronic devices and reducing a size and weight of the electronic devices.

The wireless power transferring technology may use an electromagnetic induction method using a coil, a resonance method using resonance, or a radio wave radiation method in which electrical energy is converted into a microwave and transferred. The electromagnetic induction method includes transferring electric power by using electromagnetic induction between a primary coil provided in a device for transferring wireless power and a secondary coil provided in a device for receiving wireless power.

The induction heating method of the induction heating device as described above has substantially the same principle as the wireless power transferring technology using electromagnetic induction in that an object to be heated is heated by electromagnetic induction.

Accordingly, research and development of an induction heating device capable of selectively performing an induction heating and wireless power transferring function based on a user's needs have been actively conducted.

In order to heat each of a plurality of target objects (e.g., cooking containers) or to transfer power in a wireless manner to each of a plurality of target objects (e.g., wireless power receiving devices), the induction heating device may include working coils in corresponding regions, respectively.

Recently, an induction heating device (i.e., a zone free type induction heating device) in which a single target object may be simultaneously heated by a plurality of working coils, or power is simultaneously transferred to the single target object in a wireless manner through the plurality of working coils has been widely used.

In the zone free type induction heating device, a target object may be inductively heated, or power may be transferred to the target object in a wireless manner regardless of a size and a location of the target object within a region where the plurality of working coils are present.

FIGS. 1 and 2 each illustrate example zone free type induction heating devices in related art.

Referring to FIG. 1, in the induction heating device 2, when a user selects a wireless power transferring function, a communication unit provided in an induction heating device 2 transfers information related to wireless power transfer (for example, an output, a required coil size, and the like) to a control unit 18, and determines whether or not a current coil 10' is heated and a temperature of the current coil 10'. Then, a region, where the temperature of the current coil 10' is lower than a particular temperature, is designated as a wireless power transferring region, and the region is displayed through a light emission unit.

In this example, the user may have to check a location designated by the induction heating device 2 rather than a location desired by the user, and then place a wireless power receiving object 11' at the designated location in order to use the wireless power transferring function. The induction heating device 2 does not directly recognize the wireless power receiving object 11'.

Referring to FIG. 2, in the induction heating device 10, the presence or absence of heating containers R1'-R3' is determined based on a magnitude of current (that is, RMS current) flowing through respective coils 11. And, when a magnitude of current, which is measured when a heating container is at an eccentric position, is at least 40% of a magnitude of current, which is measured when the heating container is at a non-eccentric position (that is, when the heating container is disposed right in the center of a coil), the induction heating device 10 may heat the coils 11.

In some cases, a difference in a coupling resistance depending on the presence or absence of the heating container may cause a difference in a magnitude of current. In some cases of the wireless power receiving object, as a magnitude of coupling resistance may be very small, it may be difficult to have excellent distinction capability only with a magnitude of current.

FIG. 3 is a block diagram illustrating a zone free type induction heating device in related art. As illustrated in FIG. 3, a zone free type induction heating device 9 has a structure in which individual relays R1-R4 (for example, a three-terminal relay) are respectively connected to a plurality of working coils WC1-WC4 in order to independently distinguish the plurality of working coils WC1-WC4 from one another and perform a circuit switching operation for a target object detecting operation. However, this structure may generate a noise during the switching operation of the relays R1-R4.

Further, when the target object is located over different working coil groups (for example, WC1-WC4), first and second group relays 35 and 40 have to be switched so that both of them are connected to a first inverter unit 25 or a second inverter unit 30 for synchronization control of the working coils WC1-WC4. In this case, a noise may occur owing to the switching operation of the group relays.

In some cases, a volume of circuitry may become large because the group relays 35 and 40, the individual relays R1-R4, and a target object detection circuit 45 provided to detect the target object may occupy a large portion of an area of the circuit.

SUMMARY

Disclosed is an induction heating device that can improve target object detection accuracy.

In some implementations, an induction heating device can reduce a volume of a circuit and a noise that may occur when a relay switching operation is performed by removing a relay and a target object detection circuit.

In some implementations, an induction heating system can improve capability to distinct a wireless power receiving device of the above-described induction heating device.

According to one aspect of the subject matter described in this application, an induction heating device includes: a first working coil unit comprising a first working coil and a second working coil that are connected to each other electrically in parallel; an inverter unit configured to cause a resonant current to flow in at least one of the first working coil or the second working coil by performing a switching operation; a first semiconductor switch connected to the first working coil and configured to turn on the first working coil and to turn off the first working coil; a second semiconductor switch connected to the second working coil and configured to turn on the second working coil and to turn off the second working coil; and a control unit. The control unit is configured to: apply the resonant current to the first working coil or the second working coil by controlling operation of the inverter unit, the first semiconductor switch, and the second semiconductor switch; and based on a number of pulses or a frequency of the resonant current, detect whether a target object is located at a first location corresponding to the first working coil or a second location corresponding to the second working coil.

Implementations according to this aspect may include one or more of the following features. For example, the control unit is further configured to: supply one or more pulses to the inverter unit in a predetermined cycle to detect a location of the target object; within the predetermined cycle, sequentially turn on the first semiconductor switch and turn on the second semiconductor switch based on the one or more pulses before detecting the location of the target object; and within the predetermined cycle, sequentially turn off the first semiconductor switch and turn off the second semiconductor switch based on the one or more pulses before detecting the location of the target object.

In some implementations, the control unit is further configured to: turn on the first semiconductor switch at a first point of time in the predetermined cycle; based on turning on the first semiconductor switch at the first point of time in the predetermined cycle, supply the one or more pulses to the inverter unit; detect whether the target object is located at the first location corresponding to the first working coil or the second location corresponding to the second working coil before a second point of time in the predetermined cycle, the second point of time being later than the first point of time; turn off the first semiconductor switch and turn on the second semiconductor switch at the second point of time; and based on turning off the first semiconductor switch and turning on the second semiconductor switch at the second point of time, supply the one or more pulses to the inverter unit.

In some implementations, the control unit is further configured to: detect whether the target object is located at the first location corresponding to the first working coil or the second location corresponding to the second working coil before a third point of time in the predetermined cycle, the third point of time being later than the second point of time; turn off the second semiconductor switch and turn on the first semiconductor switch at the third point of time; and based on turning off the second semiconductor switch and turning on the first semiconductor switch at the third point of time, supply the one or more pulses to the inverter unit.

In some implementations, the control unit is further configured to determine, before the second point of time after the first point of time, that the target object is not located at the first location corresponding to the first working coil (i) based on the number of pulses of the resonant current being greater than or equal to a first reference number or (ii) based on the frequency of the resonant current being equal to a first reference frequency. In some examples, the control unit is further configured to: determine that the target object is located at a first position offset from the first working coil based on the number of pulses of the resonant current being less than the first reference number and being greater than or equal to a second reference number; and determine that the target object is located at a second position different from the first position based on the number of pulses of the resonant current being less than the second reference number.

In some implementations, the control unit is further configured to: determine that the target object is located at a first position offset from the first working coil based on the frequency of the resonant current being less than the first reference frequency and being greater than or equal to a second reference frequency; and determine that the target object is located at a second position different from the first position based on the frequency of the resonant current being less than the second reference frequency. In some implementations, the control unit is further configured to: based on an elapse of a first delay after turning on the first semiconductor switch at the first point of time, supply the one or more pulses to the inverter unit; and based on an elapse of a second delay after supplying the one or more pulses to the inverter unit, turn off the first semiconductor switch at the second point of time.

In some implementations, the control unit is configured to: based on detecting the target object at the first location corresponding to the first working coil, supply a switching signal to the inverter unit, the switching signal having a frequency and a phase corresponding to a power level input from a user; and turn on or off the first semiconductor switch based on the switching signal. In some examples, the control unit is further configured to: stop supplying the switching signal to the inverter unit to detect whether an object different than the target object is located at the second working coil; simultaneously turn off the first semiconductor switch and turn on the second semiconductor switch at a start of a predetermined period of time after stopping supply of the switching signal to the inverter unit; turn on the second semiconductor switch; and after turning on the second semiconductor switch, supply the one or more pulses to the inverter unit within the predetermined period of time.

In some implementations, the control unit is further configured to: detect whether the object is located at the second working coil based on the number of pulses or the frequency of the resonant current before an end of the predetermined period of time; simultaneously turn off the second semiconductor switch and turn on the first semiconductor switch at the end of the predetermined period of time; turn on the first semiconductor switch; and after turning on the first semiconductor switch, supply the switching signal to the inverter unit.

In some implementations, the control unit is further configured to: based on the target object corresponding to a container for induction heating, detect whether the target object is located at the first location corresponding to the first working coil or the second location corresponding to the second working coil based on the number of pulses of the resonant current; and based on the target object corresponding to a wireless power receiving device, detect whether the target object is located at the first location corresponding to the first working coil or the second location corresponding to the second working coil based on the frequency of the resonant current.

In some implementations, a number of the one or more pulses is less than or equal to three. In some implementations, the control unit is further configured to simultaneously turn on the second semiconductor switch and turn off the first semiconductor switch after supplying a first pulse of the one or more pulses to the inverter unit. In some implementations, the control unit is further configured to: supply the first pulse of the one or more pulses to the inverter unit after turning on the first semiconductor switch before turning on the second semiconductor switch; and turn off the first semiconductor switch before supplying a second pulse of the one or more pulses.

In some implementations, the control unit is further configured to adjust the frequency and the phase of the switching signal based on a change of the power level input from the user. In some examples, the second position is closer to a center of the first working coil than the first position. In some implementations, the control unit is further configured to repeat supplying one or more pulses to the inverter unit until detecting the location of the target object.

In some implementations, the control unit is further configured to receive information about the target object, the information including a type of the target object, a charging mode, or an amount of power required to heat the target object. In some implementations, the control unit is further configured to determine whether the target object is a container for induction heating or a wireless power receiving device based on reception of the information about target object.

Particular implementations of the subject matter described in this specification can be implemented so as to realize one or more of the following advantages.

The induction heating device may include a control unit that is configured to detect a working coil with a target object located thereon based on the number of pulses or a frequency of a freely resonating resonant current, thereby improving target object detection accuracy.

Further, the induction heating device may perform a target object detecting operation by using a semiconductor switch and a control unit instead of a relay and a target object detection circuit, thereby solving a noise problem occurring when a relay switching operation is performed and reducing a volume of a circuit.

Furthermore, the induction heating system may maximize a change in inductance of a receiving end of a wireless power receiving device, thereby improving capability to distinct the wireless power receiving device of the induction heating device.

The induction heating device may independently distinguish the plurality of working coils from one another through the semiconductor switch and the control unit, and accordingly may turn on or off the working coils at high speed, thereby improving target object detection speed and algorithm.

Further, the induction heating device may detect whether or not a container to be inductively heated is present and whether the container is eccentric or non-eccentric based on the number of pulses of the freely resonating resonant current, and may detect whether or not a wireless power receiving device is present and whether the wireless power receiving device is eccentric or non-eccentric based on a frequency of the freely resonating resonant current.

Further, by informing a user whether a target object is eccentric or non-eccentric, the user may properly control an output of the induction heating device or a coil to be driven, thereby improving heating efficiency with respect to the target object. As a result, it is possible to improve energy efficiency (or save energy). In addition, a target object detecting operation may be continuously performed on a working coil that is not driven, thereby improving target object detection reliability.

Further, the induction heating device may perform the target object detecting operation by using the semiconductor switch and the control unit instead of the relay and the target object detection circuit, thereby reducing or eliminating a noise occurring when the switching operation of the relay is performed. As a result, it is possible to improve user satisfaction. Further, the induction heating device may improve ease of use because the user may use the induction heating device quietly during noise-sensitive time zones (for example, at dawn or late at night). In addition, the induction heating device may reduce a volume of the circuit by removing the relay and the target object detection circuit that occupy a large portion of an area of the circuit, thereby reducing an overall volume of the induction heating device. As a result, it is possible to improve space utilization.

Further, the induction heating system may maximize a change in inductance by improving a circuit structure of a receiving end of the wireless power receiving device, thereby improving capability to distinct the wireless power receiving device of the induction heating device. As a result, it is possible to improve wireless power transferring/receiving efficiency and reliability.

In addition to the advantages described above, other advantages are described below with reference to relevant figures.

DETAILED DESCRIPTION

Figure 1:
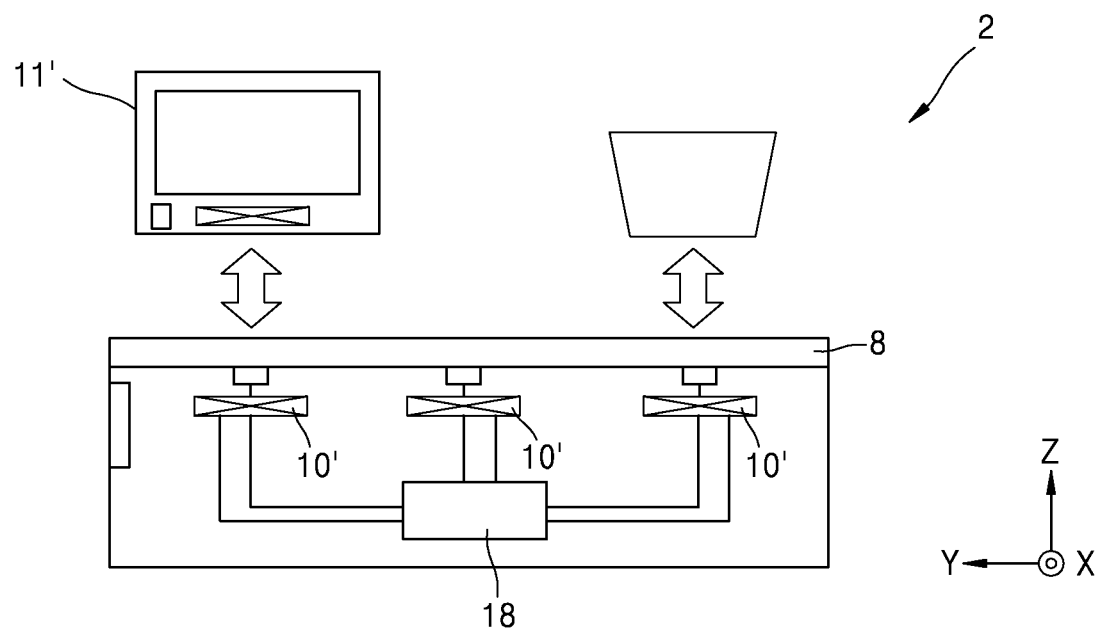
FIGS. 1 and 2 are diagrams illustrating example zone free type induction heating devices in related art.
Figure 2:
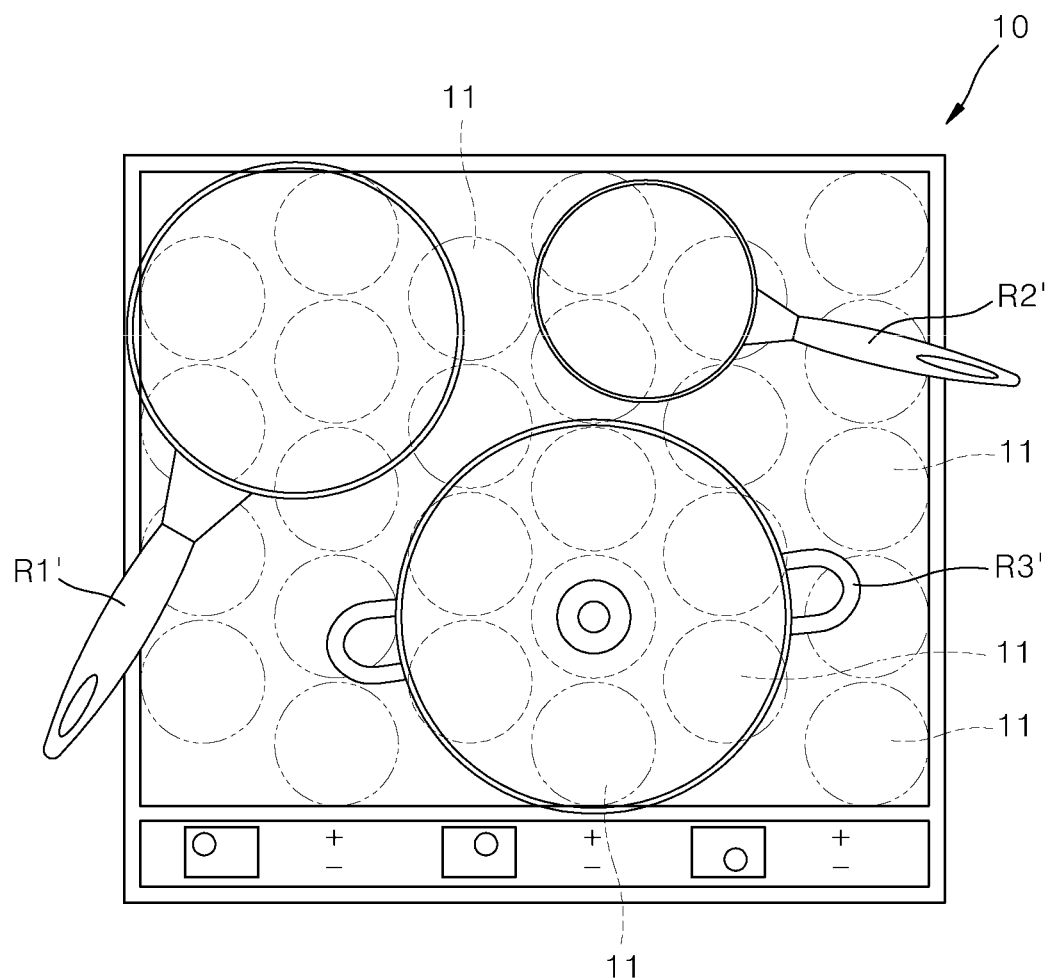
Figure 3:
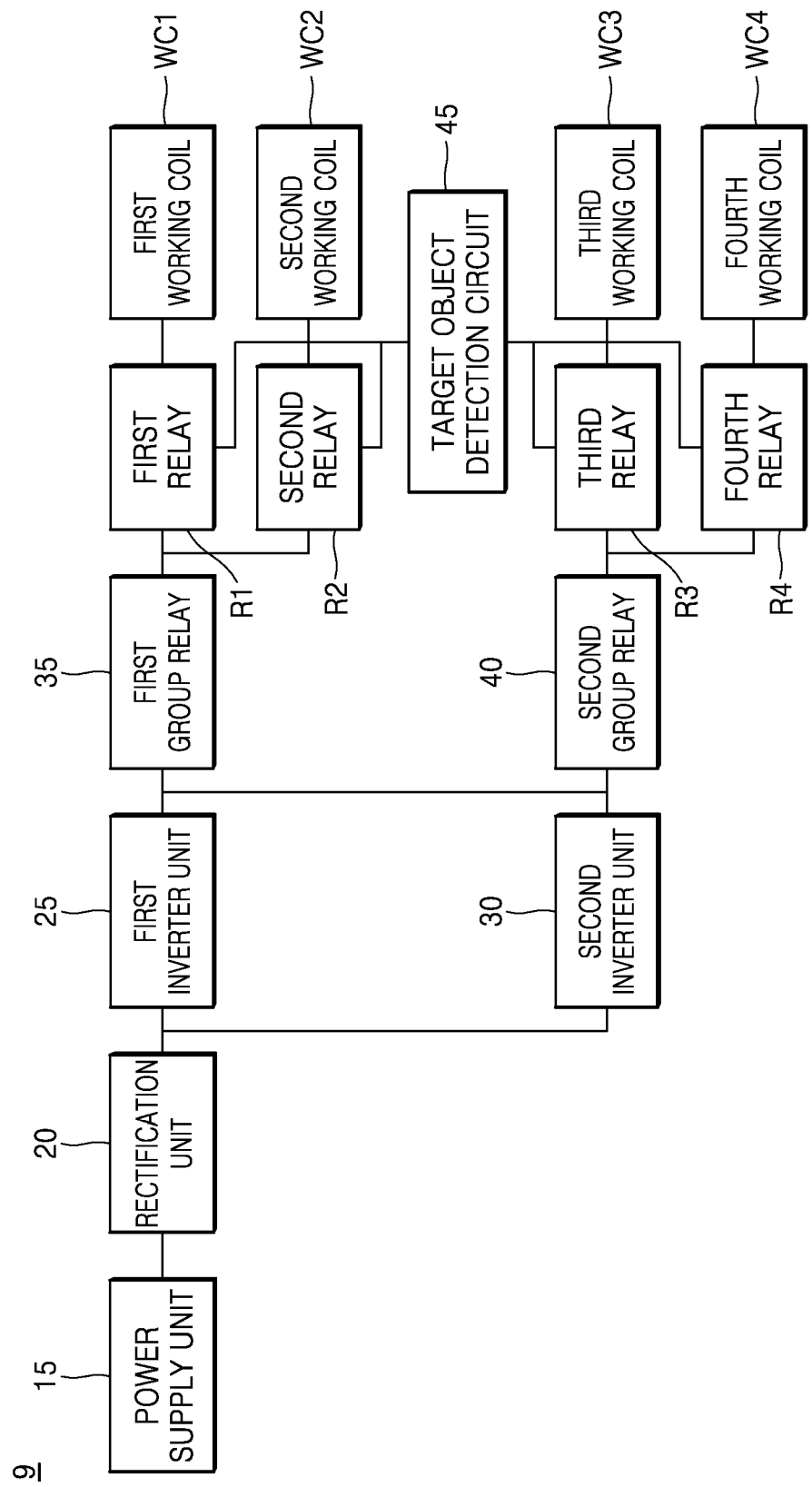
FIG. 3 is a block diagram illustrating an example zone free type induction heating device in related art.

Hereinafter, example implementations of this application will be described with reference to the accompanying drawings. In the drawings, the same reference numerals are used to indicate the same or similar components.

Hereinafter, an induction heating device according to an implementation of this application will be described.

Figure 4:
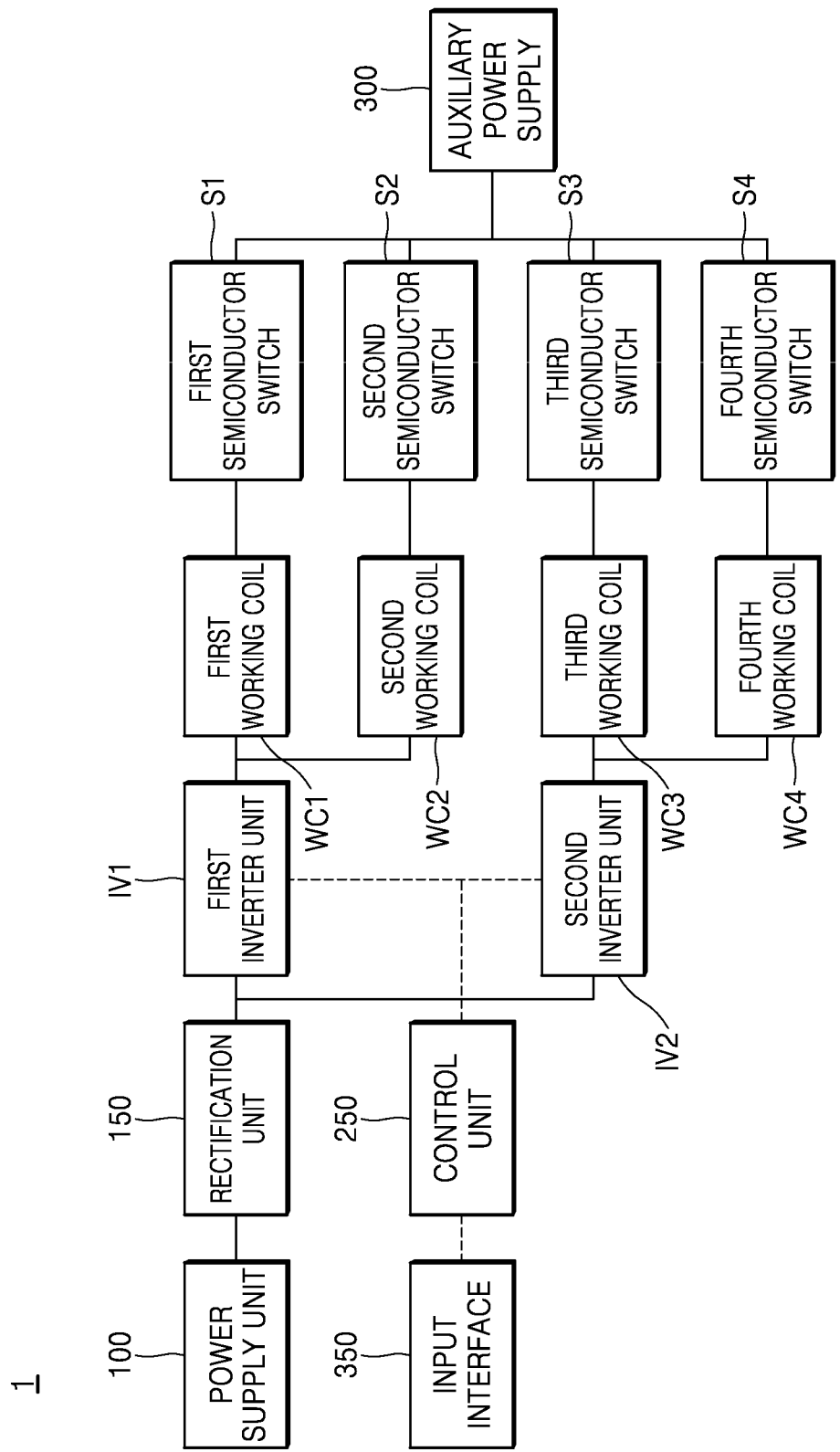
FIG. 4 is a block diagram illustrating an example induction heating device according to this application.

FIG. 4 is a block diagram illustrating an example inducting heating device according to an implementation of this application.

Referring to FIG. 4, an induction heating device 1 according to an implementation of this application may include a power supply unit 100, a rectification unit 150, first and second inverter units IV1 and IV2, a control unit 250, first to fourth working coils WC1-WC4, first to fourth semiconductor switches S1-S4, an auxiliary power supply 300, and an input interface 350.

In some implementations, the number of components (for example, an inverter unit, a working coil, a semiconductor switch, and the like) of the induction heating device 1 illustrated in FIG. 4 may be changed.

The power supply unit 100 may output alternating current (AC) power.

Specifically, the power supply unit 100 may output AC power and supply the AC power to the rectification unit 150, and may be, for example, a commercial power source.

The rectification unit 150 may convert the AC power supplied from the power supply unit 100 into direct current (DC) power and supply the DC power to at least one of the first inverter unit IV1 and the second inverter unit IV2.

Specifically, the rectification unit 150 may rectify the AC power supplied from the power supply unit 100 and convert the rectified AC power into DC power.

In some implementations, the DC power rectified by the rectification unit 150 may be supplied to a filter unit, and the filter unit may remove an AC component remaining in the corresponding DC power. For example, the DC power rectified by the rectification unit 150 may be supplied to a DC link capacitor (e.g., a smoothing capacitor), and the DC link capacitor may reduce ripple of the corresponding DC power.

Thus, the DC power rectified by the rectification unit 150 and the filter unit (or the DC link capacitor) may be supplied to at least one of the first and second inverter units IV1 and IV2.

The first inverter unit IV1 may perform a switching operation to apply a resonant current to at least one of the first and second working coils WC1 and WC2.

Specifically, the switching operation of the first inverter unit IV1 may be controlled by the control unit 250. That is, the first inverter unit IV1 may perform the switching operation based on a switching signal supplied from the control unit 250.

In some implementations, the first inverter unit IV1 may include two switching elements, and the two switching elements may be alternately turned on and off by the switching signal supplied from the control unit 250.

Further, the switching operation of these two switching elements may generate a high-frequency AC (i.e., a resonant current), and the generated high-frequency AC may be applied to at least one of the first and second working coils WC1 and WC2.

In the same manner, the second inverter unit IV2 may perform a switching operation to apply a resonant current to at least one of the third and fourth working coils WC3 and WC4.

Specifically, the switching operation of the second inverter unit IV2 may be controlled by the control unit 250. That is, the second inverter unit IV2 may perform the switching operation based on the switching signal supplied from the control unit 250.

In some implementations, the second inverter unit IV2 may include two switching elements, and the two switching elements may be alternately turned on and off by the switching signal supplied from the control unit 250.

Further, the switching operation of these two switching elements may generate high-frequency AC (i.e., a resonant current), and the generated high-frequency AC may be applied to at least one of the third and fourth working coils WC3 and WC4.

The control unit 250 may control respective operations of the first and second inverter units IV1 and IV2, the first to fourth detection units D1-D4, and the first to fourth semiconductor switches S1-S4.

Specifically, the switching operations of the first and second inverter units IV1 and IV2 may be controlled in response to the switching signal of the control unit 250, and the first to fourth semiconductor switches S1-S4 may be turned on or off in a sequential order, in a particular order, or simultaneously in response to a control signal of the control unit 250.

For example, when the first inverter unit IV1 is driven by the switching signal of the control unit 250 and the first semiconductor switch S1 is turned on by the control signal of the control unit 250, a resonant current may be applied to the first working coil WC1.

Thus, an object, e.g., a target object, which is located on the first working coil WC1, may be heated, or electric power may be transferred to the target object in a wireless manner by the resonant current applied to the first working coil WC1.

In some implementations, the control unit 250 may generate various switching signals or control signals via a pulse width modulation (PWM) function.

Further, the control unit 250 may control a driving mode of the induction heating device 1, i.e., an induction heating mode or a wireless power transferring mode.

That is, when the driving mode of the induction heating device 1 is set to the wireless power transferring mode by the control unit 250, at least one of the first to fourth working coils WC1-WC4 may be driven to transfer electric power to a target object in a wireless manner.

On the other hand, when the driving mode of the induction heating device 1 is set to the induction heating mode by the control unit 250, at least one of the first to fourth working coils WC1-WC4 may be driven to heat the target object.

Further, the control unit 250 may determine the number of working coils to be driven, and a transferred electric power amount or a heating intensity of the induction heating device 1 may vary depending on the number of working coils to be driven.

And, the control unit 250 may determine a working coil to be driven based on a location of the target object, and may also determine whether or not the switching signal between the working coils to be driven is synchronized.

And, the control unit 250 may detect resonant currents flowing through the first to fourth working coils WC1-WC4 and determine a coil with the target object located thereon among the first to fourth working coils WC1-WC4 based on the number of pulses or a frequency of each of the detected resonant currents.

Further, the control unit 250 may determine whether the target object is a magnetic body or a non-magnetic body based on values of the detected resonant currents.

Specifically, when the target object mounted on the induction heating device 1 is a magnetic body, a large magnitude of eddy current may be induced from the working coil and resonated, so that a relatively small magnitude of resonant current may flow through the working coil. However, when the target object mounted on the induction heating device 1 is not present or is a non-magnetic body, the working coil is not resonated, so that a relatively large magnitude of resonant current may flow through the working coil.

Accordingly, when a magnitude of the resonant current flowing through the working coil is smaller than that of a predetermined reference current, the control unit 250 may determine that the target object is a magnetic body. Conversely, when the magnitude of resonant current flowing through the working coil is equal to or larger than that of the predetermined reference current, the control unit 250 may determine that the target object is a non-magnetic object or is not present.

In some implementations, the induction heating device 1 may further include a detection unit that is configured to detect a resonant current flowing through the working coil, and the detection unit may perform the above-described target object detecting function.

But, in implementations of this application, a configuration in which the control unit 250 performs the target object detecting function will be described as an example for ease of explanation.

The first and second working coils WC1 and WC2 may be connected in parallel to each other.

Specifically, the first and second working coils WC1 and WC2 may be connected in parallel to each other, and may receive a resonant current from the first inverter unit IV1.

That is, when the driving mode of the induction heating device 1 is the induction heating mode, high-frequency AC applied to at least one of the first and second working coils WC1 and WC2 from the first inverter unit IV1 may generate an eddy current between a corresponding working coil and the target object, and the generated eddy current may heat the target object.

Further, when the driving mode of the induction heating device 1 is the wireless power transferring mode, the high-frequency AC applied to at least one of the first and second working coils WC1 and WC2 from the first inverter unit IV1 may generate a magnetic field in a corresponding working coil. As a result, a current may flow through a coil provided in the target object that corresponds to the corresponding working coil, and the current flowing through the coil provided in the target object may charge the target object.

Further, the first working coil WC1 may be connected to the first semiconductor switch S1, and the second working coil WC2 may be connected to the second semiconductor switch S2.

Accordingly, the respective working coils may be turned on or off at high speed by the corresponding semiconductor switches.

The third and fourth working coils WC3 and WC4 may be connected in parallel to each other.

Specifically, the third and fourth working coils WC3 and WC4 may be connected in parallel to each other, and may receive a resonant current from the second inverter unit IV2.

That is, when the driving mode of the induction heating device 1 is the induction heating mode, high-frequency AC applied to at least one of the third and fourth working coils WC3 and WC4 from the second inverter unit IV2 may generate an eddy current between a corresponding working coil and the target object, and the generated eddy current may heat the target object.

Further, when the driving mode of the induction heating device 1 is the wireless power transferring mode, the high-frequency AC applied to at least one of the third and fourth working coils WC3 and WC4 from the second inverter unit IV2 may generate a magnetic field in a corresponding working coil. As a result, a current may flow through a coil provided in the target object that corresponds to the corresponding working coil, and the current flowing through the coil provided in the target object may charge the target object.

Further, the third working coil WC3 may be connected to the third semiconductor switch S3, and the fourth working coil WC4 may be connected to the fourth semiconductor switch S4.

Accordingly, the respective working coils may be turned on or off at high speed by the corresponding semiconductor switches.

In some implementations, a working coil is turned on or off by a semiconductor switch that is configured to unblock or block a flow of the resonant current applied from an inverter unit to the working coil.

The first to fourth semiconductor switches S1-S4 may be respectively connected to the first to fourth working coils WC1-WC4 to respectively turn on or off the first to fourth working coils WC1-WC4, and may be supplied with power from the auxiliary power supply 300.

Specifically, the first semiconductor switch S1 may be connected to the first working coil WC1 to turn on or off the first working coil WC1, and the second semiconductor switch S2 may be connected to the second working coil WC2 to turn on or off the second working coil WC2. Also, the third semiconductor switch S3 may be connected to the third working coil WC3 to turn on or off the third working coil WC3, and the fourth semiconductor switch S4 may be connected to the fourth working coil WC4 to turn on or off the fourth working coil WC4.

Further, the first and second semiconductor switches S1 and S2 may be driven in line with the first inverter unit IV1 by the control unit 250 to detect whether or not the target object is present on the first and second working coils WC1 and WC2 or to control outputs of the first and second working coils WC1 and WC2.

Further, the third and fourth semiconductor switches S3 and S4 may be driven in line with the second inverter unit IV2 by the control unit 250 to detect whether or not the target object is present on the third and fourth working coils WC3 and WC4 or to control outputs of the third and fourth working coils WC3 and WC4.

In some implementations, the first to fourth semiconductor switches S1-S4 may include, for example, a static switch. Also, for example, a metal oxide semiconductor field effect transistor (MOSFET) or an insulated gate bipolar mode transistor (IGBT) may be applied to the first to fourth semiconductor switches S1-S4.

The auxiliary power supply 300 may supply power to the first to fourth semiconductor switches S1-S4.

Specifically, the auxiliary power supply 300 may have a single output structure (i.e., one output terminal). Therefore, the auxiliary power supply 300 may supply electric power to the first to fourth semiconductor switches S1-S4 with a single output. Also, the auxiliary power supply 300 may reduce the number of pins required for connection with the first to fourth semiconductor switches S1-S4 in comparison to a multiple output structure.

When a single output capacity is too large (that is, when the single output capacity is significantly out of a predetermined reference capacity), the auxiliary power supply 300 may be designed to have a double output structure (a structure in which each output terminal divides the single output capacity into capacities which are less than or equal to the predetermined reference capacity and outputs).

In some implementations, the auxiliary power supply 300 may include, for example, a switched mode power supply (SMPS), but is not limited thereto.

The input interface 350 may receive an input from a user and supply the input to the control unit 250.

Specifically, the input interface 350, which is a module for inputting a heating intensity and a driving time of the induction heating device 1 desired by a user, may be implemented in various ways such as a physical button, a touch panel or the like.

In addition, the input interface 350 may be provided with a power button, a lock button, a power level adjustment button (+, −), a timer adjustment button (+, −), a charging mode button, and the like.

The input interface 350 may supply the supplied input information to the control unit 250, and the control unit 250 may drive the induction heating device 1 in various ways on the basis of the input information supplied from the input interface 350. The following is an example of the induction heating device 1 being driven in various ways.

When the user touches the power button provided in the input interface 350 for a certain period of time in a state where the induction heating device 1 is not driven, the driving of the induction heating device 1 may be started. Conversely, when the user touches the power button for a certain period of time in a state where the induction heating device 1 is driven, the driving of the induction heating device 1 may be terminated.

Further, when the user touches the lock button for a certain period of time, all the other buttons may not be operated. Thereafter, when the user touches the lock button again for a certain period of time, all the other buttons may be operated.

Further, when the user touches the power level adjustment button (+, −) in a state where power is input, a current power level of the induction heating device 1 may be displayed numerically on the input interface 350. Also, by touch of the power level adjustment button (+, −), the control unit 250 may determine that the driving mode of the induction heating device 1 is the induction heating mode. The control unit 250 may adjust a frequency for the switching operations of the first and second inverter units IV1 and IV2 to correspond to the input power level.

Further, the user may touch the timer adjustment button (+, −) to set a driving time of the induction heating device 1. The control unit 250 may terminate the driving of the induction heating device 1 when the driving time set by the user has elapsed.

In some implementations, when the induction heating device 1 operates in the induction heating mode, the driving time of the induction heating device 1 set by the timer adjustment button (+, −) may be a heating time of the target object. Also, when the induction heating device 1 operates in the wireless power transferring mode, the driving time of the induction heating device 1 set by the timer adjustment button (+, −) may be a charging time of the target object.

When the user touches the charging mode button, the induction heating device 1 may be driven in the wireless power transferring mode.

In some implementations, the control unit 250 may receive device information about the target object through communication with the target object mounted in a driving region (i.e., an upper portion of the working coil). The device information transferred from the target object may include information such as, for example, a type of the target object, a charging mode, and an amount of power required.

Also, the control unit 250 may determine a type of the target object based on the received device information, and may recognize a charging mode of the target object.

In some implementations, the charging mode of the target object may include a normal charging mode and a high speed charging mode.

Accordingly, the control unit 250 may adjust a frequency of at least one of the first and second inverter units IV1 and IV2 based on the recognized charging mode. For example, in the high speed charge mode, the control unit 250 may adjust the frequency so that a large magnitude of resonant current is applied to the working coil in response to the switching operation of the inverter unit.

The charging mode of the target object may be input by the user through the input interface 350.

In some implementations, when the control unit 250 detects a target object (for example, a wireless power receiving device), the control unit 250 may control the input interface 350 to display a detection result of the detected target object and a wireless power transfer proposal for the target object through a user interface (UI). When a user provides an input for instructing wireless power transfer to the target object through the UI displayed on the input interface 350, the control unit 250 may drive the induction heating device 1 in the wireless power transferring mode based on the input.

Thus, the induction heating device 1 according to an implementation of this application may have the above-described features and configurations.

Hereinafter, the above-described features and configurations of the induction heating device 1 will be described with reference to FIGS. 5 and 6.

Figure 5:
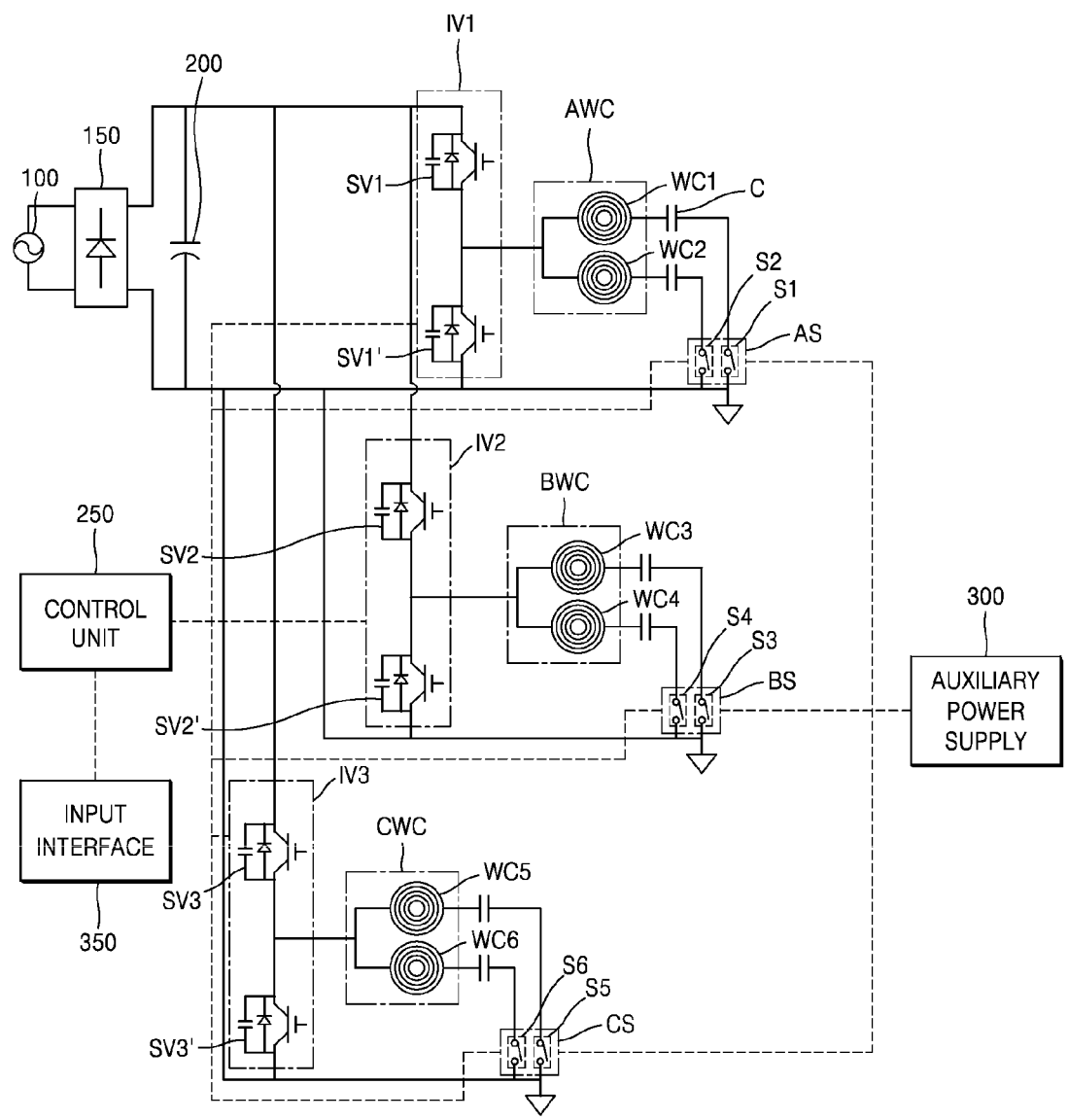
FIG. 5 is a circuit diagram specifically illustrating the induction heating device of FIG. 4.

FIG. 5 is a circuit diagram specifically illustrating the induction heating device of FIG. 4. FIG. 6 is a schematic diagram illustrating an example arrangement of the working coil of FIG. 5.

In some implementations, the induction heating device of FIG. 5 may be the induction heating device of FIG. 4. However, in some other implementations, modifications or variations can be made to the induction heating device of FIG. 5 to implement the induction heating device of FIG. 4.

First, referring to FIG. 5, an induction heating device 1 according to an implementation of this application may include a power supply unit 100, a rectification unit 150, a DC link capacitor 200, first to third inverter units IV1-IV3, first to third working coil units AWC, BWC and CWC, first to third semiconductor switch units AS, BS and CS, a control unit 250, an auxiliary power supply 300, and an input interface 350.

In some implementations, the number of the inverter units, the working coil units, the working coils, the semiconductor switch units, and the semiconductor switches are not limited to the number illustrated in FIG. 5, and may be changed.

Figure 6:
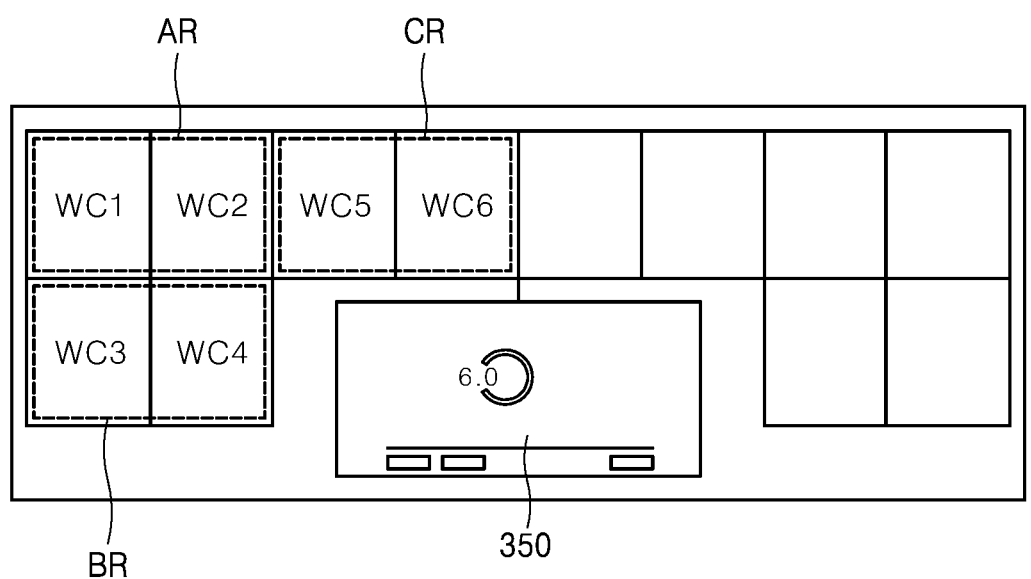
FIG. 6 is a schematic diagram illustrating an example arrangement of example working coils of FIG. 5.

With reference to FIG. 6, the working coils of FIG. 5 are arranged at a half of an entire region (a zone free region). In order to arrange working coils at the other half of the entire region, the induction heating device of FIG. 5 may further include one or more additional components such as an inverter unit, a working coil unit, a working coil, a semiconductor switch unit, and a semiconductor switch.

But, in implementations of this application, the inverter unit, working coil unit, working coil, semiconductor switch unit, and semiconductor switch of FIG. 5 will be described as an example for ease of explanation.

Specifically, the power supply unit 100 may output AC power and supply the AC power to the rectification unit 150, and the rectification unit 150 may convert the AC power supplied from the power supply unit 100 into DC power and supply the DC power to the DC link capacitor 200.

Here, the DC link capacitor 200 may be connected in parallel to the rectification unit 150.

Specifically, the DC link capacitor 200 may be connected in parallel to the rectification unit 150 to receive a DC voltage from the rectification unit 150. Also, the DC link capacitor 200 may be, for example, a smoothing capacitor, thereby reducing ripple of the supplied DC voltage.

In some implementations, the DC link capacitor 200 may receive a DC voltage from the rectification unit 150. The DC voltage may be applied to one end of the DC link capacitor 200, and the other end of the DC link capacitor 200 may be grounded by a potential difference between one end and the other end of the DC link capacitor 200.

Also, DC power (or a DC voltage) that is rectified by the rectification unit 150 and has ripple reduced by the DC link capacitor 200 may be supplied to at least one of the first to third inverter units IV1-IV3.

The first inverter unit IV1 may include two switching elements SV1 and SV1', the second inverter unit IV2 may include two switching elements SV2 and SV2', and the third inverter unit IV3 may include two switching elements SV3 and SV3'.

Also, the switching elements included in the respective inverter units IV1-IV3 may be alternately turned on and off by a switching signal supplied from the control unit 250 to convert the DC power into a high-frequency AC (i.e., a resonant current), and the converted high-frequency AC may be supplied to a working coil For example, a resonant current converted by the switching operation of the first inverter unit IV1 may be supplied to the first working coil unit AWC, and a resonant current converted by the switching operation of the second inverter unit IV2 may be supplied to the second working coil unit BWC. Also, a resonant current converted by the switching operation of the third inverter unit W3 may be supplied to the third working coil unit CWC.

A resonant current generated by the first inverter unit IV1 may be applied to at least one of the working coils WC1 and WC2 (the first and second working coils) included in the first working coil unit AWC, and a resonant current generated by the second inverter unit IV2 may be applied to at least one of the working coils WC3 and WC4 (the third and fourth working coils) included in the second working coil unit BWC. Also, a resonant current generated by the third inverter unit W3 may be applied to at least one of the working coils WC5 and WC6 (the fifth and sixth working coils) included in the third working coil unit CWC.

Here, the working coils WC1 and WC2 included in the first working coil unit AWC may be connected in parallel to each other, and the working coils WC3 and WC4 included in the second working coil unit BWC may be also connected in parallel to each other. Further, the working coils WC5 and WC6 included in the third working coil unit CWC may be connected in parallel to each other.

With reference to FIG. 6, the working coils WC1 and WC2 included in the first working coil unit AWC may be grouped and disposed in a region A (AR), and the working coils WC3 and WC4 included in the second working coil unit BWC may be grouped and disposed in a region B (BR). Also, the coils WC5 and WC6 included in the third working coil unit CWC may be grouped and disposed in a region C (CR).

The working coils may be also disposed in the other empty space, and the input interface 350 may be also disposed at a location other than the location illustrated in FIG. 6.

Referring back to FIG. 5, the first semiconductor switch unit AS may be connected to the first working coil unit AWC, the second semiconductor switch unit BS may be connected to the second working coil unit BWC, and the third semiconductor switch unit CS may be connected to the third working coil unit CWC.

Specifically, the first semiconductor switch unit AS may include two semiconductor switches S1 and S2 (the first and second semiconductor switches), and the two semiconductor switches S1 and S2 may be respectively connected to the two working coils WC1 and WC2 included in the first working coil unit AWC to respectively turn on or off the two working coils WC1 and WC2.

Here, one ends of the two semiconductor switches S1 and S2 may be respectively connected to the two working coils WC1 and WC2, and the other ends of the two semiconductor switches S1 and S2 may be connected to the other end (i.e., a ground terminal) of the DC link capacitor 200.

Further, the second semiconductor switch unit BS may include two semiconductor switches S3 and S4 (the third and fourth semiconductor switches), and the two semiconductor switches S3 and S4 may be respectively connected to the two working coils WC3 and WC4 included in the second working coil unit BWC to respectively turn on or off the two working coils WC3 and WC4.

Here, one ends of the two semiconductor switches S3 and S4 may be respectively connected to the two working coils WC3 and WC4, and the other ends of the two semiconductor switches S3 and S4 may be connected to the other end (i.e., a ground terminal) of the DC link capacitor 200.

Further, the third semiconductor switch unit CS may include two semiconductor switches S5 and S6, and the two semiconductor switches S5 and S6 may be respectively connected to the two working coils WC5 and WC6 included in the third working coil unit CWC to respectively turn on or off the two working coils WC5 and WC6.

Here, one ends of the two semiconductor switches S5 and S6 may be respectively connected to the two working coils WC5 and WC6, and the other ends of the two semiconductor switches S5 and S6 may be connected to the other end (i.e., a ground terminal) of the DC link capacitor 200.

That is, the other ends of all semiconductor switches of the first to third semiconductor switch units AS, BS and CS may be connected to the other end (i.e., a ground terminal) of the DC link capacitor 200. As a result, the auxiliary power supply 300 may supply power to all semiconductor switches through one output terminal.

In some implementations, when the semiconductor switch is connected between the inverter unit and the working coil unit, emitters of the respective semiconductor switches may be floated with respect to one other, and accordingly the number of output terminals of the auxiliary power supply 300 may increase by the number of the semiconductor switches. As a result, the number of pins of the auxiliary power supply 300 may also increase, leading to an increase in a volume of a circuit.

On the other hand, as in an implementation of this application, when all semiconductor switches are connected to the ground terminal (i.e., the other end of the DC link capacitor 200), the emitters of the semiconductor switches may be all common without being floated. Therefore, the auxiliary power supply 300 may supply power to all semiconductor switches through one output terminal. Also, the number of pins of the auxiliary power supply 300 may be reduced in comparison to a case where the emitter of the semiconductor switch is floated, and further, the volume of the circuit may be also reduced.

The other ends of all semiconductor switches may be connected to one end of the DC link capacitor 200 (i.e., a portion to which a DC voltage is applied). Also, when the single output capacity of the auxiliary power supply 300 is too large (i.e., when the single output capacity is significantly out of a predetermined reference capacity), the other ends of the semiconductor switches included in some semiconductor switch units may be connected to the other end (i.e., a ground terminal) of the DC link capacitor 200, and the other ends of the semiconductor switches included in the other semiconductor switch units may be connected to one end of the DC link capacitor 200 (i.e., a portion to which a DC voltage is applied).

But, in an implementation of this application, a configuration in which all semiconductor switches are connected to the ground terminal (i.e., the other end of the DC link capacitor 200) will be described as an example for ease of explanation.

In some implementations, the induction heating device 1 may further include a resonant capacitor (for example, C) connected between the working coil and the semiconductor switch.

When a voltage is applied by the switching operation of the inverter unit (for example, the first inverter unit IV1), the resonant capacitor C may begin to resonate. Further, when the resonant capacitor C resonates, a current flowing through the working coil (for example, WC1) connected to the resonant capacitor C may rise.

Through such a process, an eddy current may be induced to a target object that is disposed on the working coil WC1 connected to the resonant capacitor C.

The control unit 250 may control respective operations of the first to third inverter units IV1-IV3, and the first to third semiconductor switch units AS, BS and CS.

That is, the control unit 250 may supply a switching signal to control the operations of the respective inverter units IV1-IV3 and supply a control signal to control the respective semiconductor switches S1-S6.

Further, the control unit 250 may detect a resonant current flowing through at least one of the working coils WC1-WC6 included in the first to third working coil units AWC, BWC and CWC and determine a working coil with a target object located thereon based on the number of pulses or a frequency of the detected resonant current.

That is, the control unit 250 may control respective operations of the first to third inverter units IV1-IV3, and the semiconductor switches S1-S6 included in the first to third semiconductor switch units AS, BS and CS to detect a working coil with a target object located thereon among the working coils WC1-WC6 included in the first to third working coil units AWC, BWC and CWC.

Hereinafter, with reference to FIGS. 7 and 8, an example of the above-described induction heating device 1 will be described in order to specifically illustrate a method to detect a target object by the induction heating device 1.

Figure 7:
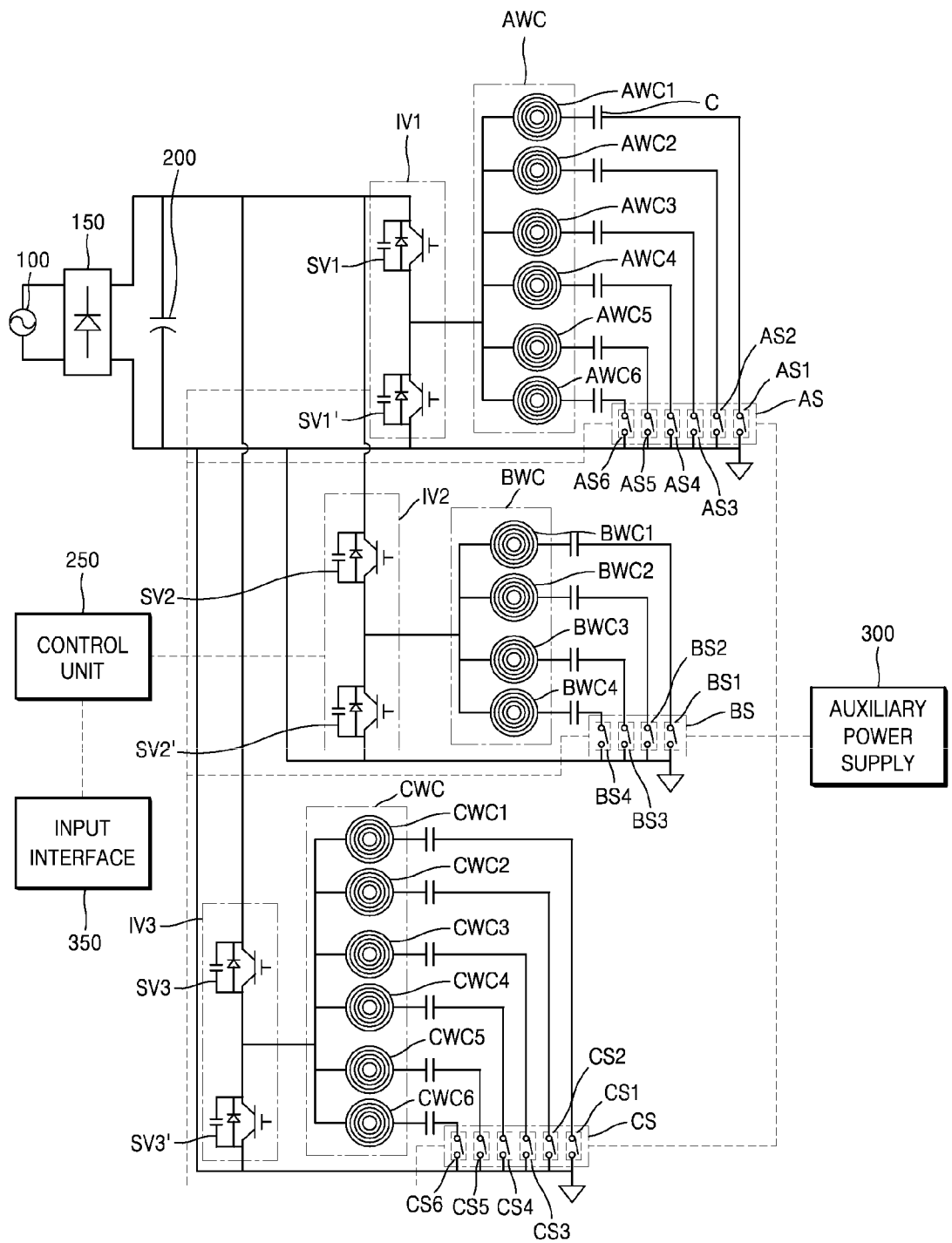
FIG. 7 is a circuit diagram illustrating an example of the induction heating device of FIG. 4.
Figure 9:
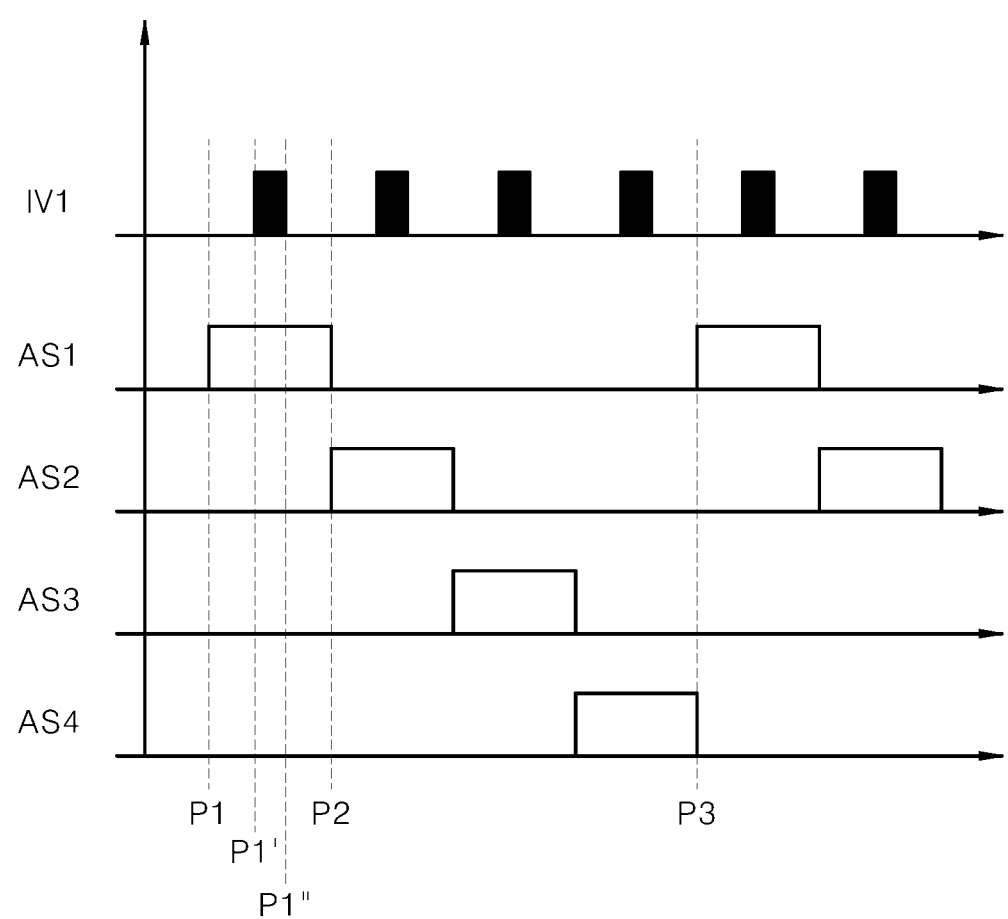
FIG. 9 is a schematic diagram illustrating an example of a method for detecting a target object by the induction heating device of FIG. 7.
Figure 10:
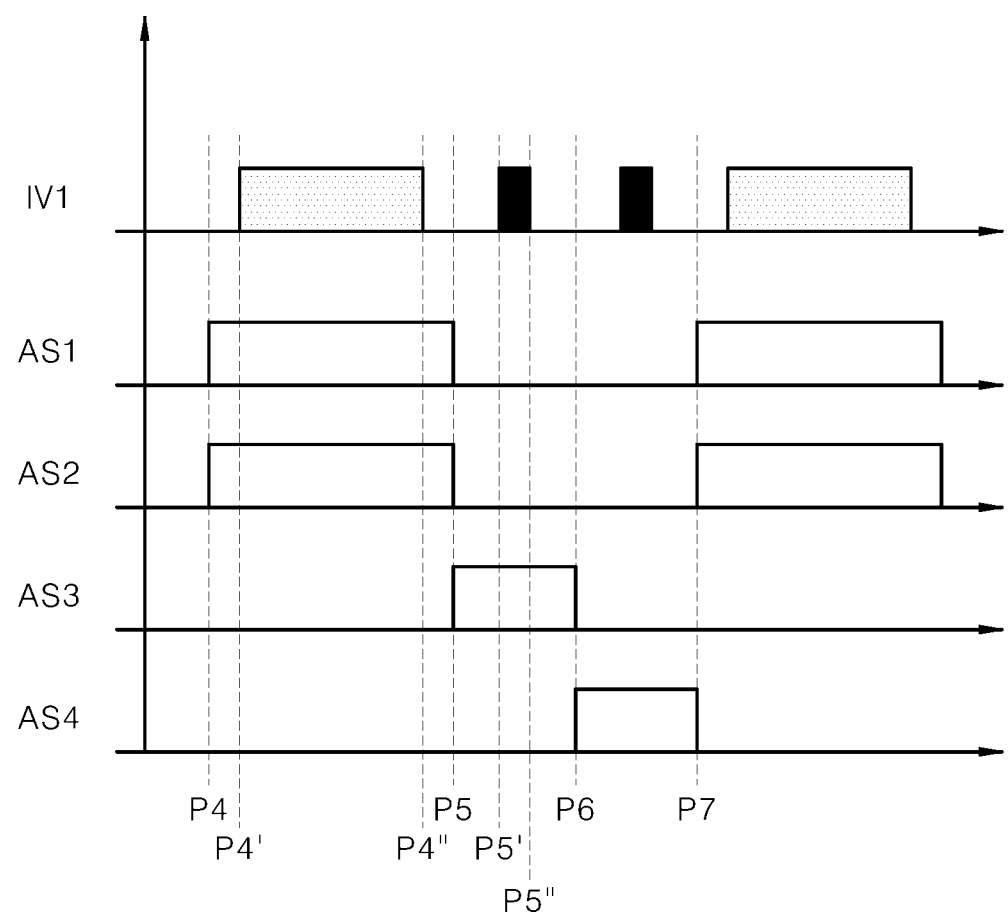
FIG. 10 is a schematic diagram illustrating another example of a method for detecting a target object by the induction heating device of FIG. 7.

FIG. 7 is a circuit diagram illustrating an example of the induction heating device of FIG. 4. FIG. 8 is a schematic diagram illustrating an example arrangement of the working coil of FIG. 7. FIG. 9 is a schematic diagram illustrating one example of a method for detecting a target object by the induction heating device of FIG. 7. FIG. 10 is a schematic diagram illustrating another example of a method for detecting a target object by the induction heating device of FIG. 7. FIGS. 11 to 16 are schematic diagrams illustrating examples of a method for detecting a target object by the induction heating device illustrated in FIGS. 9 and 10.

In some implementations, the induction heating device of FIG. 7 may be the induction heating device of FIG. 4. However, in some other implementations, modifications or variations can be made to the induction heating device of FIG. 7 to implement the induction heating device of FIG. 4.

The induction heating device 1 may include a power supply unit 100, a rectification unit 150, a DC link capacitor 200, first to third inverter units IV1-IV3, first to third working coil units AWC, BWC and CWC, first to third semiconductor switch units AS, BS and CS, a control unit 250, an auxiliary power supply 300, and an input interface 350.

In this example of the induction heating device 1, the first working coil unit AWC may include six working coils AWC1-AWC6, the second working coil unit BWC may include four working coils BWC1-BWC4, and the third working coil unit CWC may include six working coils CWC1-CWC6. Also, the first semiconductor switch unit AS may include six semiconductor switches AS1-AS6, the second semiconductor switch unit BS may include four semiconductor switches BS1-BS4, and the third semiconductor switch unit CS may include six semiconductor switches CS1-CS6 in line with the number of working coils.

Figure 8:
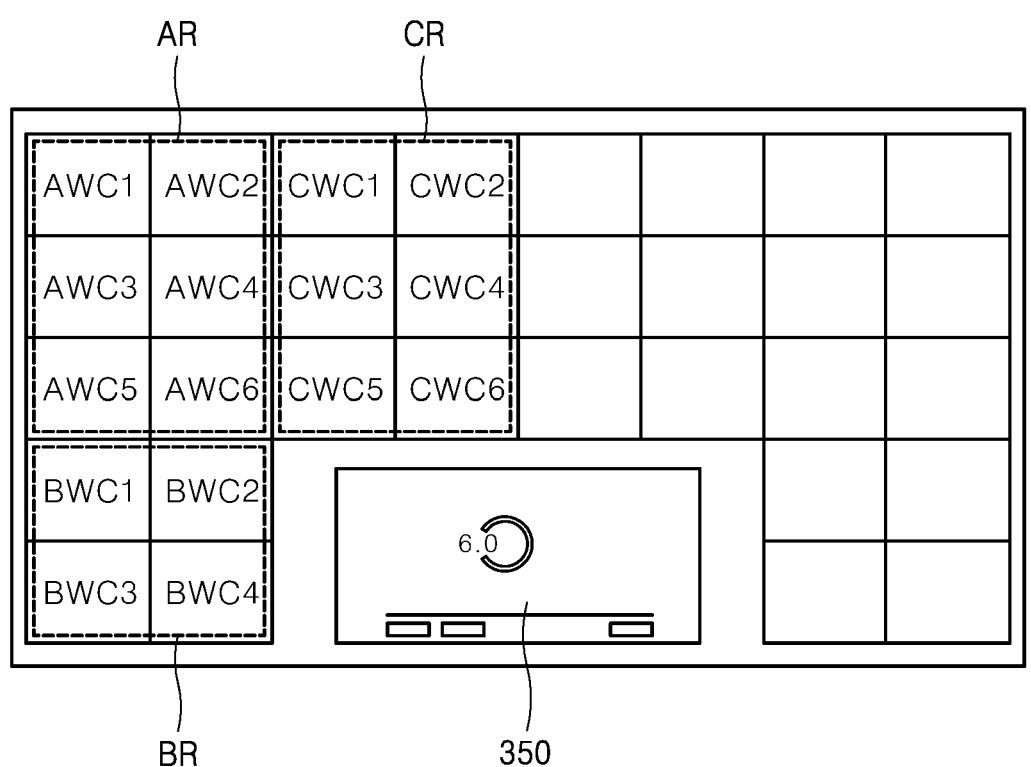
FIG. 8 is a schematic diagram illustrating an example arrangement of example working coils of FIG. 7.

With reference to FIG. 8, the working coils AWC1-AWC6 included in the first working coil unit AWC may be grouped and disposed in a region A (AR), and the working coils BWC1-BWC4 included in the second working coil unit BWC may be grouped and disposed in a region B (BR). Also, the working coils CWC1-CWC6 included in the third working coil unit CWC may be grouped and disposed in a region C (CR).

The working coils may be also disposed in the other empty space, and the input interface 350 may be also disposed at a location other than the location illustrated in FIG. 8.

Here, one example of a method to detect a target object by the induction heating device 1 will be described with reference to FIGS. 7 and 9.

For ease of explanation, a process of detecting a target object in the region A (AR of FIG. 4) where the first working coil unit AWC is disposed will be described as an example, assuming that the first working coil unit AWC includes four working coils and the first semiconductor switch unit AS includes four semiconductor switches AS1-AS4 that are respectively connected to the four working coils.

Referring to FIGS. 7 and 9, the control unit 250 may supply N pulses (here, N is any one of 1, 2 and 3, and when N is 1, a one pulse shot is supplied to the first inverter unit IV1 as a switching signal) to the first inverter IV1 every predetermined cycle to detect a location of the target object.

Every time the N pulses are supplied from the control unit 250, the first inverter unit IV1 may be turned on and off accordingly. As a result, free resonance may occur in a circuit including the first working coil unit AWC.

Here, when the control unit 250 supplies continuous pulses (i.e., four or more pulses) instead of the N pulses, a problem may occur in the standby power. Thus, the control unit 250 may cyclically supply the N pulses to the first inverter unit IV1.

Hereinafter, for ease of explanation, a case where the N pulses are one pulse (i.e., a single pulse) will be described as an example.

The control unit 250 may sequentially turn on or off the four semiconductor switches AS1-AS4 in line with each single pulse before a location of the target object is detected.

That is, the control unit 250 may turn on the first semiconductor switch AS1 at a first time point P1, and then may supply a single pulse to the first inverter unit IV1 when a first delay during a certain period of time P1-P1' has elapsed. Here, the reason for having a first delay elapsed time is that a certain period of time is required for the first semiconductor switch AS1 to be stabilized after being turned on.

Subsequently, after the single pulse is supplied to the first inverter unit IV1, a second delay during a certain period of time P1"-P2 may elapse again. Here, the reason for having a second delay elapsed time is that a certain period of time is required to perform a signal processing operation and a target object detecting operation for the single pulse supplied to the first inverter unit IV1.

When the target object is not detected before a second time point P2 when a predetermined cycle has elapsed after the first time point P1, the control unit 250 may turn off the first semiconductor switch AS1 and turn on the second semiconductor switch AS2, and then may supply the single pulse to the first inverter unit IV1 again.

In addition, the control unit 250 may sequentially repeat the above-described process for the third and fourth semiconductor switches AS3 and AS4 until the target object is detected.

But, when the target object is not detected before a third time point P3, the control unit 250 may turn off the fourth semiconductor switch AS4 and turn on the first semiconductor switch AS1 at the third time point P3, and then may supply the single pulse to the first inverter unit IV1 again, thereby repeating the above-described process.

In some implementations, when the single pulse is supplied to the first inverter unit IV1 after the first semiconductor switch AS1 is turned on, the resonant current may flow only through the first working coil AWC1. In some examples, the control unit 250 may detect a resonant current flowing through the first working coil AWC1, and may detect whether or not a target object is located on the first working coil AWC1 based on the number of pulses or a frequency of the detected resonant current.

Additionally, when a target object (for example, a container to be inductively heated) is located on the first working coil AWC1, a resistance of the target object may increase a total resistance, resulting in an increase in an attenuation degree of the resonant current flowing through the first working coil AWC1. Accordingly, the number of pulses of the resonant current may be reduced.

Also, when a target object (for example, a wireless power receiving device) is located on the first working coil AWC1, inductance of the target object may increase total inductance, resulting in a decrease in a frequency of the resonant current flowing through the first working coil AWC1.

As described above, the control unit 250 may detect a resonant current flowing through the first working coil AWC1, and may detect a target object located on the first working coil based on the number of pulses or a frequency of the detected resonant current.

Details thereof will be described later.

As described above, with respect to the second to fourth working coils AWC2-AWC4, the control unit 250 may sequentially detect whether or not a target object is located thereon, and may continuously repeat this process.

Further, the above-described target object detecting operation for the first working coil unit AWC may be also performed in the same manner for the second and third working coil units BWC and CWC.

Subsequently, another example of a method to detect a target object by the induction heating device 1 will be described with reference to FIGS. 7 and 10.

For ease of explanation, a process of detecting a target object in the region A (AR of FIG. 8) where the first working coil unit AWC is disposed will be described as an example, assuming that the first working coil unit AWC includes four working coils and the first semiconductor switch unit AS includes four semiconductor switches AS1-AS4 that are respectively connected to the four working coils.

Referring to FIGS. 7 and 10, when a target object is detected on the first and second working coils AWC1 and AWC2, the control unit 250 may turn on the first and second semiconductor switches AS1 and AS2 at a fourth time point P4, and then may supply a switching signal whose frequency and phase are adjusted to correspond to a power level (i.e., a heating intensity or a power transferring amount) input from the user to the first inverter unit IV1.

As a result, a resonant current may be applied to the first and second working coils AWC1 and AWC2, and the target object located on the first and second working coils may be inductively heated or receive power in a wireless manner.

In some implementations, the control unit 250 may also supply the switching signal to the first inverter unit IV1 when a third delay during a certain period of time P4-P4' has elapsed after the first and second semiconductor switches AS1 and AS2 are turned on. The reason for having a third delay elapsed time is that a certain period of time is required for the first and second semiconductor switches AS1 and AS2 to be stabilized after being turned on.

Also, the control unit 250 may continuously detect whether or not another target object other than the target object (i.e., the target object located on the first working coil AWC1 and the second working coil AWC2) is located on a working coil that is not driven (i.e., the third working coil AWC3 or the fourth working coil AWC4).

That is, the control unit 250 may stop supplying the switching signal to the first inverter unit IV1 to detect whether or not another object is located on the working coil that is not driven.

Specifically, when a fourth delay during a certain period of time P4"-P5 has elapsed after stopping the supply of the switching signal to the first inverter unit IV1, the control unit 250 may turn off the first and second semiconductor switches AS1 and AS2 and turn on the third semiconductor switch AS3 simultaneously with the start of a predetermined period of time P5-P7 (for example, a period of time that corresponds to the number of working coils that are not driven X a predetermined cycle). Then, the control unit 250 may supply a single pulse to the first inverter unit IV1 within a predetermined period of time.

Here, the reason for having a fourth delay elapsed time is that a certain period of time is required to perform a signal processing operation for the switching signal supplied to the first inverter unit IV1.

For the same reason as described above, when the control unit 250 supplies a single pulse to the first inverter unit IV1 within a predetermined period of time, the control unit 250 may have a delay during a period of time of P5-P5' and P5"-P6 before and after a time point of supplying the single pulse.

The control unit 250 may sequentially turn on or off the third and fourth semiconductor switches AS3 and AS4 at a predetermined cycle in the same manner as the above-described method in order to detect another target object.

Also, when another target object is not detected on the third working coil AWC3 or the fourth working coil AWC4 before a predetermined period of time (for example, P5-P7) ends, the control unit 250 may turn off the fourth semiconductor switch AS4 and turn on the first and second semiconductor switches AS1 and AS2 simultaneously with the end of the predetermined period of time (i.e., a seventh time point P7). Then, the control unit 250 may supply the above-described switching signal to the first inverter unit IV1 again.

In some implementations, with reference to FIG. 10, the third semiconductor switch AS3 is already turned off at a sixth time point P6, and the switching signal supplied to the first inverter unit IV1 after the seventh time point P7 is a switching signal whose frequency and phase are adjusted to correspond to the power level input from the user Thus, even after a target object is detected, the control unit 250 may continuously detect whether or not another target object is located on a working coil that is not driven.

The above-described target object detecting operation for the first working coil unit AWC may be also performed in the same manner for the second and third working coil units BWC and CWC.

Here, with reference to FIGS. 11 to 16, a method to distinguish and detect a target object based on the detected resonant current by the control unit 250 will be described.

Figure 11:
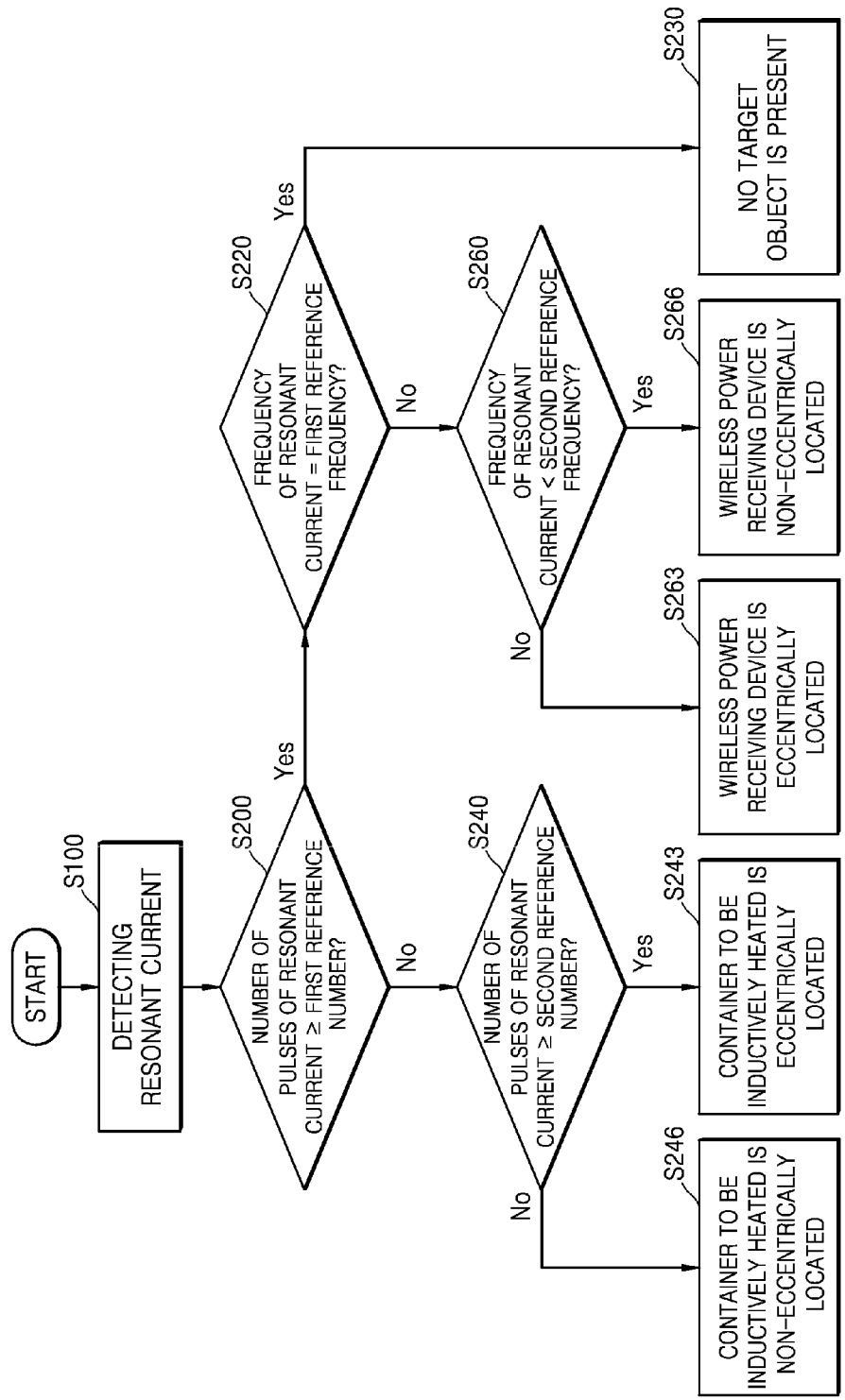
FIGS. 11 to 16 are schematic diagrams illustrating examples of a method for detect a target object by the induction heating device illustrated in FIGS. 9 and 10.

First, referring to FIGS. 7 and 11, the control unit 250 may detect a resonant current at step S100.

Specifically, the control unit 250 may detect a resonant current flowing through a working coil (i.e., a freely resonating resonant current).

Thereafter, the control unit 250 may compare the number of pulses of the detected resonant current to a first reference number at step S200.

Specifically, the control unit 250 may detect whether or not a container to be inductively heated is present among target objects based on the number of pulses of the detected resonant current.

Figure 12:
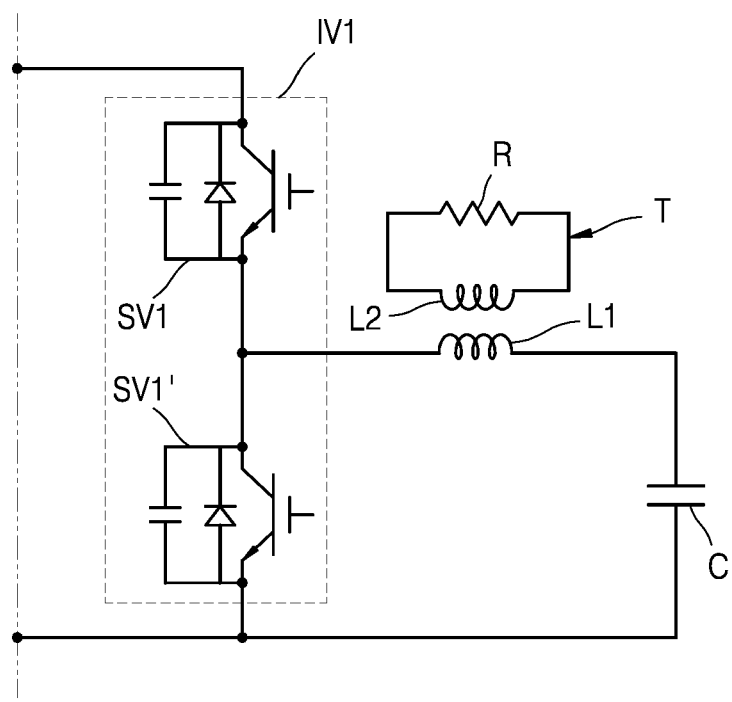
Figure 13:
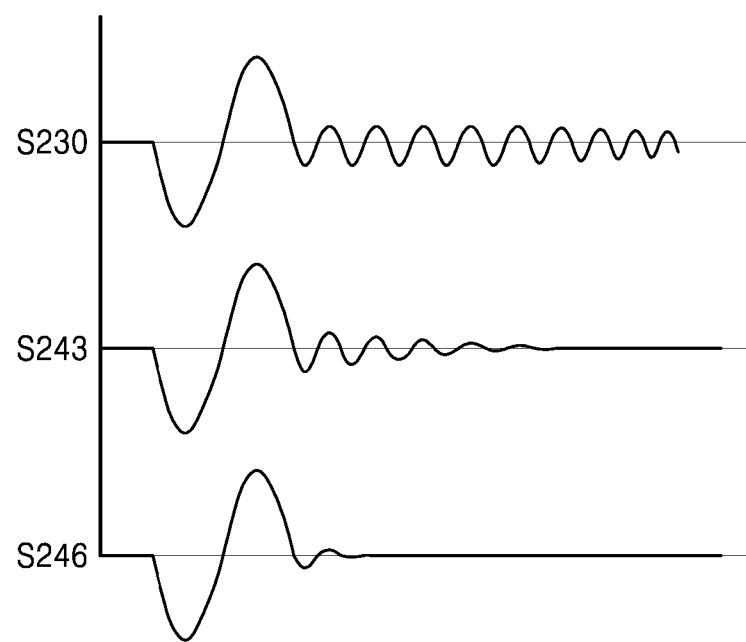

That is, with reference to FIG. 12, for example, a freely resonating resonant current may flow through a first inductor L1 (for example, the working coil AWC1 of FIG. 7) by a switching operation of the first inverter unit IV1 (that is, an operation of switching elements SV1 and SV1' being alternately turned on and off). Accordingly, a magnetic flux may occur between a conversion inductor L2 (i.e., a second inductor) and the first inductor L1 of a target object T (for example, a container to be inductively heated) and an induced current may flow to the target object T. At this time, an equivalent resistance R of the target object T may increase a total resistance, resulting in an increase in an attenuation degree (i.e., (a parasitic resistance of R+L1)/(2* (L1+L2))) of the resonant current.

As described above, when an attenuation degree of a resonant current increases, the number of pulses of the resonant current may decrease. The control unit 250 may detect a change in the number of pulses of the resonant current, thereby detecting whether or not the target object T is present and whether the target object T is eccentric or non-eccentric.

Implementations of this application illustrate a method to detect whether or not the target object T (that is, a container to be inductively heated) is present, and whether the target object T is eccentric or non-eccentric based on a change in the number of pulses of the resonant current, but are not limited thereto. That is, it is possible to detect whether or not the target object T (that is, a container to be inductively heated) is present, or whether the target object T is eccentric or non-eccentric based on a change in a pulse width of a freely resonating resonant current.

But, in implementations of this application, a configuration in which the control unit 250 detects whether or not a target object T (that is, a container to be inductively heated) is present, and whether the target object T is eccentric or non-eccentric based on a change in the number of pulses of a resonant current will be described as an example for ease of explanation.

Referring back to FIGS. 7, 11 and 13, when the number of pulses of the detected resonant current is less than the first reference number, the control unit 250 may compare the number of pulses of the corresponding resonant current to a second reference number at step S240.

In some implementations of this application, "equal to or greater than" and "greater than", and "equal to or less than" and "less than" may be mixed. But, for ease of explanation, only one of "equal to or greater than" and "greater than", and only one of "equal to or less than" and "less than" are used in implementations of this application.

The second reference number (for example, three pulses) may be less than the first reference number. When the number of pulses of the detected resonant current is less than the first reference number, the control unit 250 may determine that a target object is located on a corresponding working coil.

More specifically, when the number of pulses of the detected resonant current is less than the first reference number and is equal to or greater than the second reference number, the control unit 250 may determine that a target object is eccentrically located on a corresponding working coil at step S243.

When the number of pulses of the detected resonant current is less than the second reference number, the control unit 250 may determine that a target object is non-eccentrically located on a corresponding working coil at step S246.

In some implementations, when a target object is eccentrically located on a working coil, the target object may be, for example, located over only a portion of the working coil or offset from the working coil, not right in the center of the working coil. Also, when a target object is non-eccentrically on a working coil, the target object may be, for example, located right in the center of the working coil.

When the number of pulses of the detected resonant current is equal to or greater than the first reference number, the control unit 250 may compare a frequency of the resonant current to a first reference frequency at step S220.

Specifically, the control unit 250 may detect whether or not a wireless power receiving device is present among target objects based on a frequency of the detected resonant current.

Figure 14:
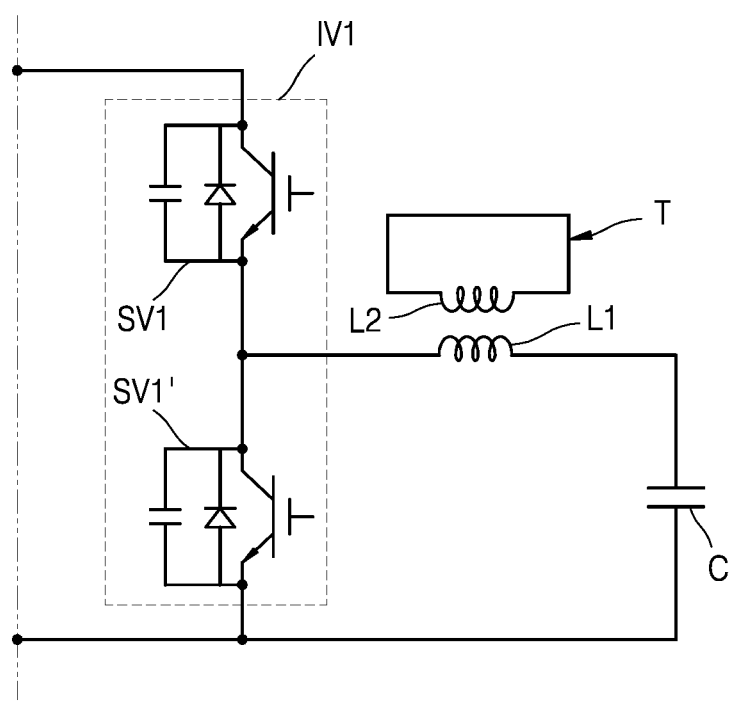
Figure 15:
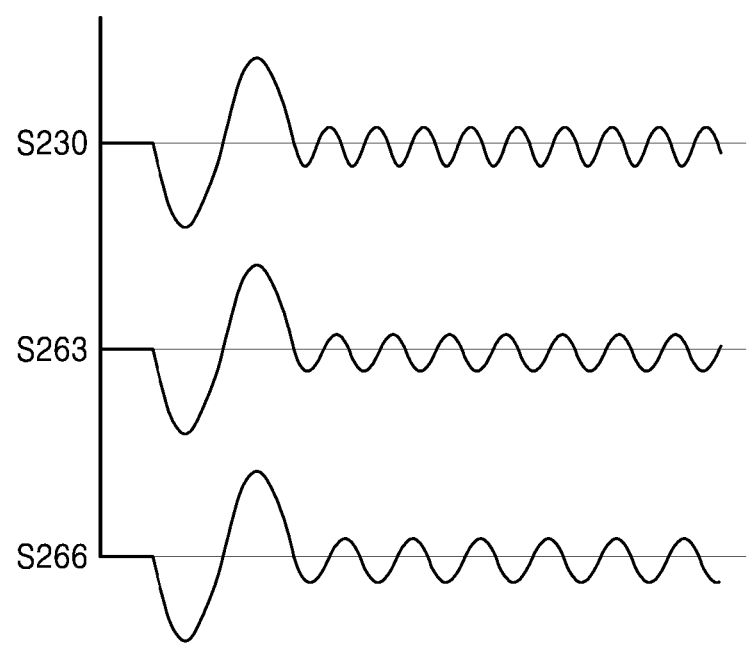

That is, with reference to FIG. 14, for example, a freely resonating resonant current may flow through the first inductor L1 (for example, the working coil AWC1 of FIG. 7) by a switching operation of the first inverter unit IV1 (that is, an operation of the switching elements SV1 and SV1' being alternately turned on and off). Accordingly, electromagnetic induction may occur between a receiving end working coil L2 (i.e., a second inductor) and the first inductor L1 of a target object T (for example, a wireless power receiving device). As a result, total inductance may increase, and accordingly a frequency $(1/\sqrt{((L1+L2)*C)})$ of the resonant current may decrease.

As described above, when a frequency of a resonant current decreases, the control unit 250 may detect a change in the frequency of the resonant current, thereby detecting whether or not the target object T is present, and whether the target object T is eccentric or non-eccentric.

Referring back to FIGS. 7, 11 and 15, when a frequency of the detected resonant current is the first reference frequency, the control unit 250 may determine that no target object is present on a corresponding working coil at step S230.

Here, the first reference frequency may be, for example, a particular frequency used when generating a corresponding resonant current, but is not limited thereto. That is, the first reference frequency may be a frequency predefined by a user.

On the other hand, when the frequency of the detected resonant current is not the first reference frequency, the control unit 250 may compare the frequency of the resonant current to a second reference frequency at step S260.

In some implementations, the second reference frequency may be a frequency lower than the first reference frequency. When the frequency of the detected resonant current is less than the first reference frequency, the control unit 250 may determine that a target object is located on a corresponding working coil.

More specifically, when the frequency of the detected resonant current is less than the first reference frequency and is equal to or greater than the second reference frequency, the control unit 250 may determine that the target object is eccentrically located on the corresponding working coil at step S263.

Further, when the frequency of the detected resonant current is less than the second reference frequency, the control unit 250 may determine that the target object is non-eccentrically located on the corresponding working coil at step S266.

As described above, the control unit 250 may detect whether or not a container to be inductively heated is present and whether the container is eccentric or non-eccentric based on the number of pulses of the detected resonant current, and may determine whether or not a wireless power receiving device is present and whether the wireless power receiving is eccentric or non-eccentric based on the frequency of the detected resonant current.

Figure 16:
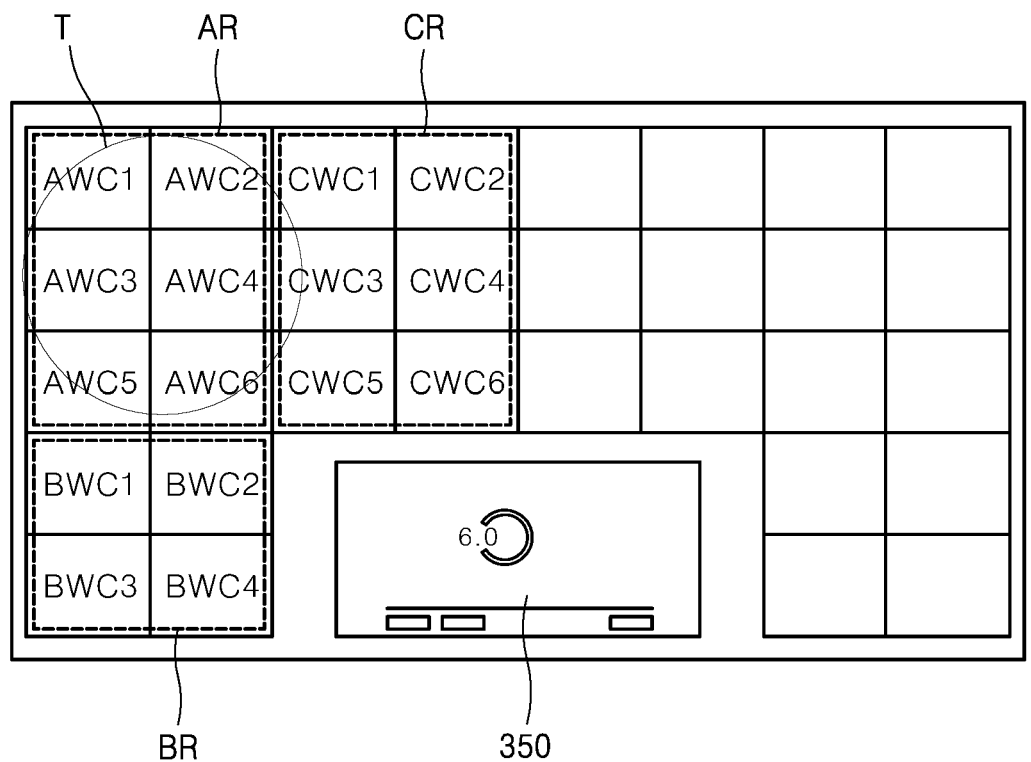

Accordingly, when the target object T is disposed at a location illustrated in FIG. 16, the control unit 250 may determine that the target object T is non-eccentric with respect to the working coils AWC3 and AWC4 and is eccentric with respect to the working coils AWC1, AWC2, AWC5 and AWC6, and no target object is present on the working coils CW1, CWC3 and CWC5.

As described above, the induction heating device 1 according to an implementation of this application may independently distinguish a plurality of working coils AWC1-AWC6, BWC1-BWC4 and CWC1-CWC6 from one another through the semiconductor switches AS1-AS6, BS1-BS4 and CS1-CS6 and the control unit 250, and accordingly may turn on or off the plurality of working coils AWC1-AWC6, BWC1-BWC4 and CWC1-CWC6 at high speed, thereby improving target object detection speed and algorithm. Further, the induction heating device 1 may detect whether or not a container to be inductively heated is present and whether the container is eccentric or non-eccentric based on the number of pulses of a freely resonating resonant current, and may detect whether or not a wireless power receiving device is present and whether the wireless power receiving device is eccentric or non-eccentric based on a frequency of the freely resonating resonant current, thereby improving target object detection accuracy. In addition, a target object detecting operation may be continuously performed on a working coil that is not driven, thereby improving target object detection reliability.

Also, the induction heating device 1 according to an implementation of this application may perform a target object detecting operation by using the semiconductor switches AS1-AS6, BS1-BS4 and CS1-CS6 and the control unit 250 instead of a relay and a target object detection circuit, thereby solving a noise problem occurring when a switching operation of the relay is performed. As a result, it is possible to improve user satisfaction. Further, the induction heating device 1 may improve ease of use because the user may use the induction heating device 1 quietly during noise-sensitive time zones (for example, at dawn or late at night). In addition, the induction heating device 1 may reduce a volume of a circuit by removing the relay and the target object detection circuit that occupy a large portion of the area of the circuit, thereby reducing an overall volume of the induction heating device 1. As a result, it is possible to improve space utilization.

Figure 17:
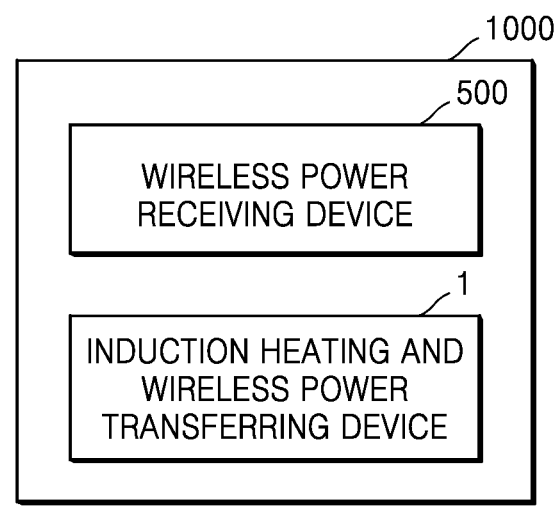
FIG. 17 is a block diagram illustrating an example induction heating system.

Hereinafter, with reference to FIGS. 17 to 19, an example induction heating system according to another implementation of this application will be described In some implementations, the induction heating device 1 illustrated in FIG. 17 is the same as the induction heating device 1 described above with reference to FIGS. 4 to 16, and thus a description thereof will be omitted.

First, referring to FIG. 17, an induction heating system 1000 may include an induction heating device 1 and a wireless power receiving device 500.

Specifically, a receiving end provided in the wireless power receiving device 500 may be provided with a working coil.

Accordingly, power may be supplied to the wireless power receiving device 500 through electromagnetic induction occurring between a corresponding working coil and a working coil provided in the induction heating device 1.

Figure 18:
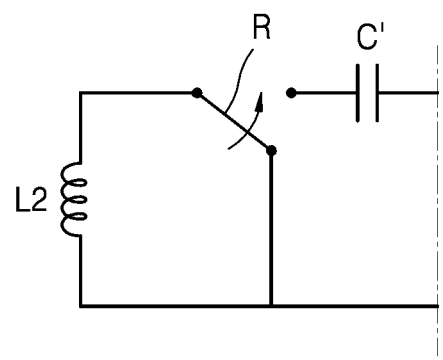
FIG. 18 is a circuit diagram illustrating an example of a receiving end of the example wireless power receiving device of FIG. 17.

Here, FIGS. 17 and 18 each illustrate one example of the receiving end of the wireless power receiving device 500.

Specifically, a relay R (or a switch) may be located at the receiving end of the wireless power receiving device 500. In order to make only the second inductor L2 visible at the receiving end of the wireless power receiving device 500, the relay R may be switched so that the receiving end remains in a short state, as illustrated in FIG. 18. Accordingly, an inductance value of the wireless power receiving device 500 may be maximized.

As a result, the control unit (250 of FIG. 7) of the induction heating device 1 may easily detect a frequency of a resonant current that varies with a wide width (that is, a resonant current flowing through the working coil provided in the induction heating device 1) in line with the maximized inductance value of the wireless power receiving device 500. Further, the control unit 250 may easily detect whether or not the wireless power receiving device 500 is present, and whether the wireless power receiving device 500 is eccentric or non-eccentric.

When power of the wireless power receiving device 500 is driven after the control unit (250 of FIG. 7) detects the presence of the wireless power receiving device 500, the relay R may be switched to be connected to a capacitor C'. Accordingly, the wireless power receiving device 500 may be in a state in which power can be supplied thereto from the induction heating device 1.

Figure 19:
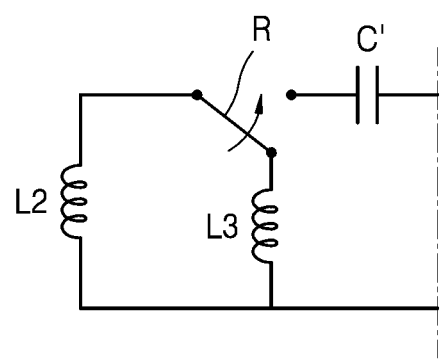
FIG. 19 is a circuit diagram illustrating another example of a receiving end of the example wireless power receiving device of FIG. 17.

FIGS. 17 and 19 each illustrate another example of the receiving end of the wireless power receiving device 500.

Specifically, unlike FIG. 18, the receiving end of the wireless power receiving device 500 may be provided with a third inductor L3 in addition to the second inductor L2. As a result, the inductance value of the wireless power receiving device 500 may be further maximized.

Accordingly, the control unit (250 of FIG. 7) of the induction heating device 1 may more easily detect a frequency of a resonant current that varies with a wide width (that is, a resonant current flowing through the working coil provided in the induction heating device 1) in line with the maximized inductance value of the wireless power receiving device 500. Further, the control unit 250 may easily detect whether or not the wireless power receiving device 500 is present, and whether the wireless power receiving device 500 is eccentric or non-eccentric.

As described above, the induction heating system 1000 according to another implementation of this application may maximize a change in inductance by improving a circuit structure of the receiving end of the wireless power receiving device 500, thereby improving capability to distinct the wireless power receiving device of the induction heating device 10. As a result, it is possible to improve wireless power transferring/receiving efficiency and reliability.

Since various substitutions, changes, and modifications can be made within the scope that does not deviate the technical idea of this application for those skilled in the art to which this application pertains, this above-mentioned application is not limited by the above-mentioned implementations and the accompanying drawings.

What is claimed is:

1. An induction heating device, comprising:
a first working coil and a second working coil that are connected to each other electrically in parallel;
an inverter comprising at least two switches configured to cause a resonant current to flow in at least one of the first working coil or the second working coil by performing a switching operation;
a first semiconductor switch connected to the first working coil and configured to turn on or turn off the first working coil;
a second semiconductor switch connected to the second working coil and configured to turn on or turn off the second working coil; and a processor configured to:
apply the resonant current to the first working coil or the second working coil by controlling the inverter, the first semiconductor switch, and the second semiconductor switch, respectively,
identify a number of pulses or a frequency of the resonant current applied to the first working coil or the second working coil, and
based on the number of pulses or the frequency of the resonant current, determine whether a target object is located at a first location corresponding to the first working coil or a second location corresponding to the second working coil.

2. The induction heating device of claim 1, wherein the processor is further configured to:
supply one or more pulses to the inverter in a predetermined cycle to identify a location of the target object; and
within the predetermined cycle, sequentially turn on or turn off the first semiconductor switch and the second semiconductor switch based on the one or more pulses before identifying the location of the target object.

3. The induction heating device of claim 2, wherein a number of the one or more pulses is less than or equal to three.

4. The induction heating device of claim 2, wherein the processor is further configured to simultaneously turn on the second semiconductor switch and turn off the first semiconductor switch after supplying a first pulse of the one or more pulses to the inverter.

5. The induction heating device of claim 4, wherein the processor is further configured to:
supply the first pulse of the one or more pulses to the inverter after turning on the first semiconductor switch before turning on the second semiconductor switch; and
turn off the first semiconductor switch before supplying a second pulse of the one or more pulses.

6. The induction heating device of claim 2, wherein the processor is further configured to repeat supplying the one or more pulses to the inverter until identifying the location of the target object.

7. The induction heating device of claim 2, wherein the processor is further configured to:
turn on the first semiconductor switch at a first time in the predetermined cycle;
based on turning on the first semiconductor switch, supply the one or more pulses to the inverter;
determine whether the target object is located at the first location corresponding to the first working coil or the second location corresponding to the second working coil before a second time in the predetermined cycle, the second time being later than the first time;
turn off the first semiconductor switch and turn on the second semiconductor switch at the second time; and
based on turning off the first semiconductor switch and turning on the second semiconductor switch at the second time, supply the one or more pulses to the inverter.

8. The induction heating device of claim 7, wherein the processor is further configured to:
determine whether the target object is located at the first location corresponding to the first working coil or the second location corresponding to the second working coil before a third time in the predetermined cycle, the third time being later than the second time;

turn off the second semiconductor switch and turn on the first semiconductor switch at the third time; and based on turning off the second semiconductor switch and turning on the first semiconductor switch at the third time, supply the one or more pulses to the inverter.

9. The induction heating device of claim 7, wherein the processor is further configured to determine, before the second time after the first time, that the target object is not located at the first location corresponding to the first working coil (i) based on the number of pulses of the resonant current being greater than or equal to a first reference number or (ii) based on the frequency of the resonant current being equal to a first reference frequency.

10. The induction heating device of claim 9, wherein the processor is further configured to:

determine that the target object is located at a first position offset from the first working coil based on the number of pulses of the resonant current being less than the first reference number and being greater than or equal to a second reference number; and determine that the target object is located at a second position different from the first position based on the number of pulses of the resonant current being less than the second reference number.

11. The induction heating device of claim 10, wherein the second position is closer to a center of the first working coil than the first position.

12. The induction heating device of claim 9, wherein the processor is further configured to:

determine that the target object is located at a first position offset from the first working coil based on the frequency of the resonant current being less than the first reference frequency and being greater than or equal to a second reference frequency; and determine that the target object is located at a second position different from the first position based on the frequency of the resonant current being less than the second reference frequency.

13. The induction heating device of claim 7, wherein the processor is further configured to:

based on an elapse of a first delay after turning on the first semiconductor switch at the first time, supply the one or more pulses to the inverter; and based on an elapse of a second delay after supplying the one or more pulses to the inverter, turn off the first semiconductor switch at the second time.

14. The induction heating device of claim 2, wherein the processor is configured to:

based on determining that the target object is located at the first location corresponding to the first working coil, supply a switching signal to the inverter, the switching signal having a frequency and a phase corresponding to a power level that is input from a user; and turn on or turn off the first semiconductor switch based on the switching signal.

15. The induction heating device of claim 14, wherein the processor is further configured to:

stop supplying the switching signal to the inverter to determine whether an object different than the target object is located at the second working coil;

simultaneously turn off the first semiconductor switch and turn on the second semiconductor switch at a start of a predetermined time period after stopping supply of the switching signal to the inverter; and after turning on the second semiconductor switch, supply the one or more pulses to the inverter within the predetermined time period.

16. The induction heating device of claim 15, wherein the processor is further configured to:

determine whether the object is located at the second working coil based on the number of pulses or the frequency of the resonant current before an end of the predetermined time period;

simultaneously turn off the second semiconductor switch and turn on the first semiconductor switch at the end of the predetermined time period;

turn on the first semiconductor switch; and after turning on the first semiconductor switch, supply the switching signal to the inverter.

17. The induction heating device of claim 14, wherein the processor is further configured to adjust the frequency and the phase of the switching signal based on a change of the power level that is input from the user.

18. The induction heating device of claim 17, wherein the processor is further configured to receive information about the target object, the information including a type of the target object, a charging mode, or an amount of power required to heat the target object.

19. The induction heating device of claim 18, wherein the processor is further configured to determine whether the target object is a container for induction heating or a wireless power receiving device based on receiving the information about the target object.

20. The induction heating device of claim 1, wherein the processor is further configured to:

based on the target object corresponding to a container for induction heating, determine whether the target object is located at the first location corresponding to the first working coil or the second location corresponding to the second working coil based on the number of pulses of the resonant current; and based on the target object corresponding to a wireless power receiving device, determine whether the target object is located at the first location corresponding to the first working coil or the second location corresponding to the second working coil based on the frequency of the resonant current.

\* \* \* \* \*